United States Patent
Sato

(10) Patent No.: US 8,354,994 B2
(45) Date of Patent: Jan. 15, 2013

(54) ELECTROPHORETIC DISPLAY DEVICE THAT EXECUTES REFRESH OPERATION AT APPROPRIATE TIMING

(75) Inventor: Hirokazu Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1222 days.

(21) Appl. No.: 12/171,472

(22) Filed: Jul. 11, 2008

(65) Prior Publication Data

US 2008/0278436 A1 Nov. 13, 2008

Related U.S. Application Data

(63) Continuation-in-part of application No. PCT/JP2007/050321, filed on Jan. 12, 2007.

(30) Foreign Application Priority Data

| Jan. 13, 2006 | (JP) | 2006-006823 |
| Jan. 13, 2006 | (JP) | 2006-006824 |
| Jan. 13, 2006 | (JP) | 2006-006825 |

(51) Int. Cl.
*G09G 3/034* (2006.01)
(52) U.S. Cl. .......... 345/107; 345/204; 359/296
(58) Field of Classification Search .......... 345/107, 345/204; 359/296
See application file for complete search history.

(56) References Cited

U.S. PATENT DOCUMENTS

| 6,426,737 B1 * | 7/2002 | MacLean et al. | 345/107 |
| 2004/0227720 A1 * | 11/2004 | Shikina et al. | 345/107 |

FOREIGN PATENT DOCUMENTS

| JP | 2000-321605 A | 11/2000 |
| JP | 2005-345624 A | 12/2005 |
| WO | 2004-104977 A1 | 12/2004 |
| WO | WO 2005027088 A1 * | 3/2005 |
| WO | WO 2005071650 A1 * | 8/2005 |
| WO | WO 2005101362 A1 * | 10/2005 |

OTHER PUBLICATIONS

Japanese Patent Office, International Search Report for International Application No. PCT/JP2007/050321, mailed Mar. 6, 2007.
Japan Patent Office; Office Action for Patent Application No. 2006-006823, dated Nov. 16, 2010. (counterpart to above-captioned U.S. patent application).

(Continued)

*Primary Examiner* — Lun-Yi Lao
*Assistant Examiner* — Sosina Abebe
(74) *Attorney, Agent, or Firm* — Baker Botts L.L.P.

(57) ABSTRACT

A dispersion medium is filled in a display section and is dispersed with charged particles that migrates in accordance with a direction of an electric field. An image forming section applies, upon receiving an image forming request, an electric voltage between a first electrode and a second electrode to generate the electric field in the dispersion medium, thereby performing an image forming operation. A refresh controlling section switches, before the image forming section performs the image forming operation, the direction of the electric field alternately at predetermined timing to uniformly disperse the charged particles in the dispersion medium, thereby performing a refresh operation. An image-formation-elapsed-time measuring section measures a first elapsed time from a previous image forming operation performed by the image forming section until the image forming request. A refresh determining section determines whether the refresh controlling section performs the refresh operation based on the first elapsed time.

18 Claims, 19 Drawing Sheets

OTHER PUBLICATIONS

Japan Patent Office; Office Action for Patent Application No. 2006-006824, dated Nov. 16, 2010. (counterpart to above-captioned U.S. patent application).

Japan Patent Office; Office Action for Patent Application No. 2006-006825, dated Nov. 16, 2010. (counterpart to above-captioned U.S. patent application).

* cited by examiner

ELECTROPHORETIC DISPLAY DEVICE THAT EXECUTES REFRESH OPERATION AT APPROPRIATE TIMING

CROSS REFERENCE TO RELATED APPLICATION

This application claims priorities from Japanese Patent Application Nos. 2006-006823, 2006-006824, and 2006-006825, all of which were filed on Jan. 13, 2006. This is also a Continuation-In-Part Application of International Application No. PCT/JP2007/050321 filed Jan. 12, 2007 in Japan Patent Office as a Receiving Office. The entire disclosures of these applications are hereby incorporated by reference.

TECHNICAL FIELD

The invention relates to an electrophoretic display device that displays an image by using an electrophoretic phenomenon.

BACKGROUND

An electrophoretic display device that displays an image by using an electrophoretic phenomenon is generally known. Such an electrophoretic display device includes a display substrate that is transparent, a back substrate disposed in confrontation with the display substrate, and a gap spacer interposed between the display substrate and the back substrate and provided along the periphery of the substrates. A hermetically-sealed space having a predetermined gap is formed between the display substrate and the back substrate via the gap spacer. The hermetically-sealed space is filled with dispersion medium made of colored liquid or gas in which charged particles that are colored spherical particles are dispersed, thereby forming a display section.

With such a configuration, for example, in an electrophoretic display device in which white charged particles are dispersed in dispersion medium made of black liquid, the two substrates generate an electric field in the display section to migrate the charged particles in the dispersion medium to the display substrate side for displaying white color of the charged particles on a front surface of the display substrate, or to migrate the charged particles to the back substrate side for displaying black color of the dispersion medium on the front surface of the display substrate. A desired image is obtained in this way.

With such a conventional electrophoretic display device, the charged particles may agglutinate or aggregate in a part of the display section as time elapses. Further, the charged particles may settle out in the display liquid when an image is not displayed for a long time. If the charged particles agglutinate, aggregate, or settle out in this way, the charged particles cannot migrate sufficiently even when an electric field is generated in the display liquid, leading to problems of degraded image quality such as color heterogeneity in an image and a low contrast of an image.

In order to prevent such degradation of image quality, it is conceivable to apply a higher voltage with electrodes to generate a stronger electric field for preventing agglutinate of the charged particles and the like. With this method, however, there are problems that a power consumption of the electrophoretic display device increases substantially and that handling of the device becomes more difficult because of high voltage.

Hence, Japanese Patent Application Publication No. 2000-321605 discloses a method in which pulse voltages with opposite polarity are applied alternately prior to image formation. With this method, separation of charged particles adhering to a wall surface can be facilitated, thereby promoting electrophoresis of the charged particles.

SUMMARY

It is desirable that an operation for applying pulse voltages having opposite polarities alternately (hereinafter referred to as "refresh operation") is executed at appropriate timing in accordance with a state of the display section.

For example, if a voltage is not applied for a long time in an electrophoretic display device in which white charged particles are dispersed in dispersion medium made of black liquid, pixels displaying white color changes gradually to gray color (hereinafter refer-red to as "gray degradation"). If an image forming operation is executed in a state of this gray degradation, the charged particles adhere to the substrate.

In view of the foregoing, it is an object of the invention to provide an electrophoretic display device that executes a refresh operation at appropriate timing.

In order to attain the above and other objects, the invention provides an electrophoretic display device. The electrophoretic display device includes a first substrate, a second substrate, a display section, a dispersion medium, an image forming section, a refresh controlling section, an image-formation-elapsed-time measuring section, and a refresh determining section. The first substrate has a first electrode. The second substrate has a second electrode and is arranged in confrontation with the first substrate. The first substrate and the second substrate form a space therebetween. The first electrode and the second electrode are configured to generate an electric field having a direction. The direction is changeable depending on an electric voltage applied between the first electrode and the second electrode. The display section is provided in the space. The dispersion medium is filled in the display section and is dispersed with a plurality of electrically-charged particles that migrates in accordance with the direction of the electric field. The image forming section applies, upon receiving an image forming request, the electric voltage between the first electrode and the second electrode to generate the electric field in the dispersion medium, thereby performing an image forming operation. The refresh controlling section switches, before the image forming section performs the image forming operation, the direction of the electric field alternately at predetermined timing to uniformly disperse the plurality of electrically-charged particles in the dispersion medium, thereby performing a refresh operation. The image-formation-elapsed-time measuring section measures a first elapsed time from a previous image forming operation performed by the image forming section until the image forming request. The refresh determining section determines whether the refresh controlling section performs the refresh operation based on the first elapsed time.

According to another aspect, the invention also provides an electrophoretic display device. The electrophoretic display device includes a first substrate, a second substrate, a display section, a dispersion medium, an image forming section, a refresh controlling section, and a refresh determining section. The first substrate has a first electrode. The second substrate has a second electrode and is arranged in confrontation with the first substrate. The first substrate and the second substrate form a space therebetween. The first electrode and the second electrode are configured to generate an electric field having a direction, the direction being changeable depending on an electric voltage applied between the first electrode and the second electrode. The display section is provided in the space.

The dispersion medium is filled in the display section and is dispersed with a plurality of electrically-charged particles that migrates in accordance with the direction of the electric field. The image forming section applies, upon receiving an image forming request, the electric voltage between the first electrode and the second electrode to generate the electric field in the dispersion medium, thereby performing an image forming operation. The refresh controlling section switches, before the image forming section performs the image forming operation, the direction of the electric field alternately at predetermined timing to uniformly disperse the plurality of electrically-charged particles in the dispersion medium, thereby performing a refresh operation. The refresh determining section determines whether the refresh controlling section performs the refresh operation based on a display content that is a content of an image formed by the image forming request.

According to still another aspect, the invention also provides an electrophoretic display device. The electrophoretic display device includes a first substrate, a second substrate, a display section, a dispersion medium, an image forming section, a refresh controlling section, a temperature detecting section, an image-formation-times counting section, and a refresh determining section. The first substrate has a first electrode. The second substrate has a second electrode and is arranged in confrontation with the first substrate. The first substrate and the second substrate form a space therebetween. The first electrode and the second electrode are configured to generate an electric field having a direction, the direction being changeable depending on an electric voltage applied between the first electrode and the second electrode. The display section is provided in the space. The dispersion medium is filled in the display section and is dispersed with a plurality of electrically-charged particles that migrates in accordance with the direction of the electric field. The image forming section applies, upon receiving an image forming request, the electric voltage between the first electrode and the second electrode to generate the electric field in the dispersion medium, thereby performing an image forming operation. The refresh controlling section switches, before the image forming section performs the image forming operation, the direction of the electric field alternately at predetermined timing to uniformly disperse the plurality of electrically-charged particles in the dispersion medium, thereby performing a refresh operation. The temperature detecting section detects a temperature at predetermined timing. The image-formation-times counting section counts a number of image formation times at which the image forming section performs the image forming operation after the refresh controlling section performs the refresh operation. The refresh determining section determines whether the refresh controlling section performs the refresh operation based on both the temperature and the number of image formation times.

BRIEF DESCRIPTION OF THE DRAWINGS

Embodiments in accordance with the invention will be described in detail with reference to the following figures wherein:

FIGS. 4A through 4C are timing charts for showing an example of a voltage V1 applied to an upper electrode during a refresh operation and an image forming operation, a voltage V2 applied to a lower electrode during the same operations, and a potential difference V1-V2 between the upper electrode and the lower electrode during the same operations, wherein FIG. 4A shows the voltage V1, FIG. 4B shows the voltage V2, and FIG. 4C shows the potential difference V1-V2;

DETAILED DESCRIPTION

An electrophoretic display device according to a first embodiment of the invention will be described while referring to FIGS. 1 through 8. The electrophoretic display device of the first embodiment is applied to an image display device 1. The image display device 1 includes a small-type display panel 2 and a control unit 3 to form an integral unit. The display panel 2 is of a type that can be provided to a portable electronic device. The control unit 3 controls displaying of images on the display panel 2.

Figure 1:
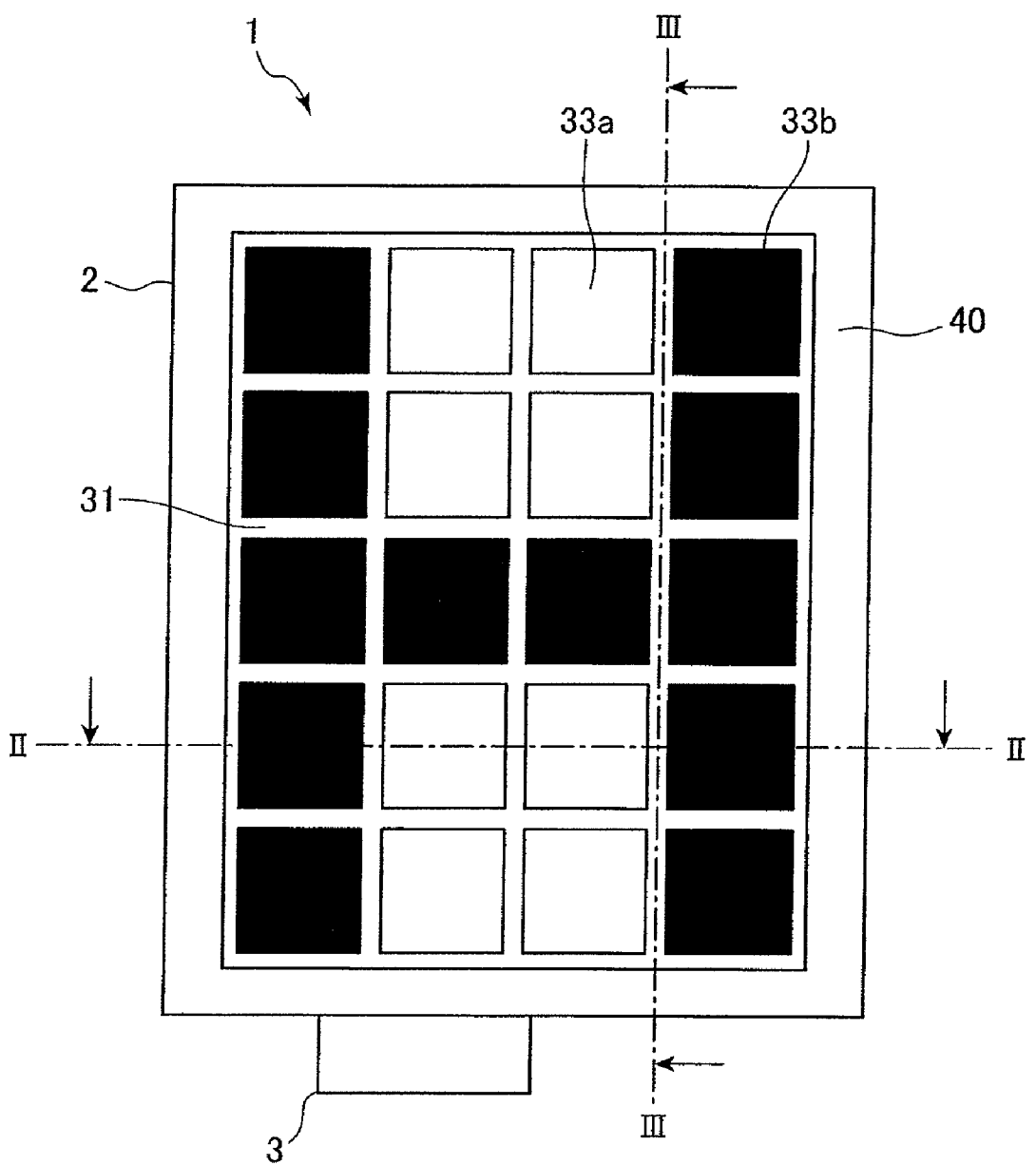
FIG. 1 is a front view of an image display device according to a first embodiment of the invention.
Figure 2:
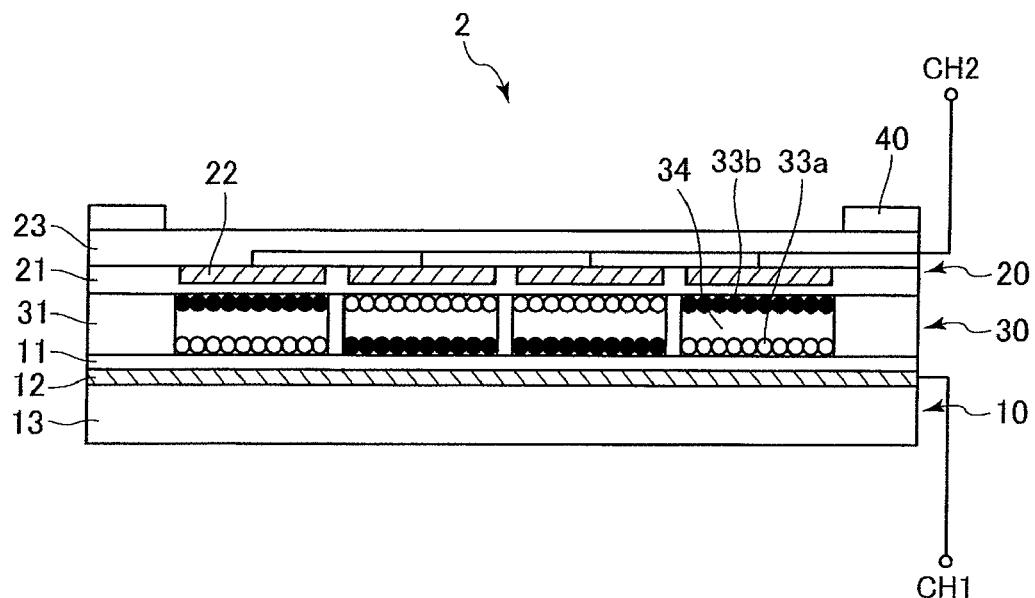
FIG. 2 is a cross-sectional view taken along a line II-II in FIG. 1, for showing the internal structure of a display panel of the image display device shown in FIG. 1.
Figure 3:
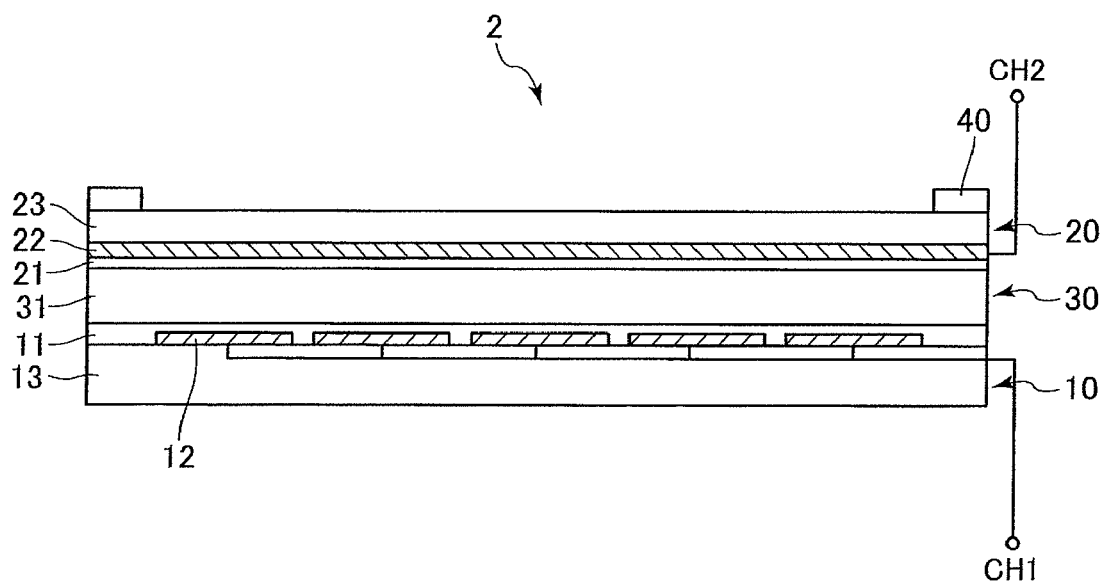
FIG. 3 is a cross-sectional view taken along a line III-III in FIG. 1, for showing the internal structure of the display panel.

FIG. 1 is a front view of the image display device 1. FIG. 2 is a cross-sectional view taken along a line II-II in FIG. 1, for showing the internal structure of the display panel 2. FIG. 3 is a cross-sectional view taken along a line III-III in FIG. 1, for showing the internal structure of the display panel 2. Note that the upper side in FIGS. 2 and 3 is referred to as the front of the image display device 1.

As shown in FIGS. 1 through 3, the display panel 2 has a rectangular parallelepiped shape that is long in the vertical direction in the front view of FIG. 1, for example. The control unit 3 is provided on a side of the display panel 2. The display panel 2 and the control unit 3 are electronically connected to each other. The display panel 2 includes a lower substrate 10 and an upper substrate 20. The lower substrate 10 is provided at the lower part of the display panel 2, while the upper substrate 20 is provided at the upper part of the display panel 2 and is disposed in confrontation with the lower substrate 10. A display section 30 is provided between the lower substrate 10 and the upper substrate 20. Note that the line II-II is a line in parallel with a lateral direction of the image display device 1 (left-right direction of FIG. 1), and the line III-III is a line in parallel with a longitudinal direction of the image display device 1 (upper-lower direction of FIG. 1).

The lower substrate 10 includes a lower electrode 12, a lower electrode protection layer 11, and a support section 13. The lower electrode 12 is for generating an electric field in the display section 30. The lower electrode protection layer 11 is an insulation layer formed, for example, by coating an insulating material on an upper surface side of the lower electrode 12. The support section 13 is provided on a lower surface side of the lower electrode 12 and supports the image display device 1. The lower electrode protection layer 11 is made of a material having a high insulation capability, the material including a resin film such as polyethylene terephthalate and silica, an inorganic material such as glass, or the like. In the present embodiment, the lower electrode protection layer 11 and the support section 13 are plastic substrates (resin films) made of flexible polyethylene terephthalate. The lower electrode 12 is a substrate having a plurality of electrodes that are linear-shaped electrically conductive members arranged in parallel with the lateral direction (the line II-II direction) and arranged with a predetermined width of gap, so that a constant voltage is applied.

In the upper direction of the lower substrate 10 (upper directions in FIGS. 2 and 3), the upper substrate 20 is disposed in confrontation with the lower substrate 10 and is parallel with the lower substrate 10 with a predetermined width therebetween. The upper substrate 20 includes an upper electrode 22, an upper electrode protection layer 21, and a display layer 23. The upper electrode 22 is for generating an electric field in the display section 30. The upper electrode protection layer 21 is an insulation layer formed, for example, by coating an insulating material on a lower surface side of the upper electrode 22. The display layer 23 is provided on an upper surface side of the upper electrode 22 and is made of a transparent material, thereby functioning as a display screen. The upper electrode protection layer 21 is made of a material having a high degree of transparency, such as polyimide, polyethylene terephthalate, and glass. The upper electrode 22 is a substrate having a plurality of electrodes that are linear-shaped electrically conductive members arranged in parallel with the longitudinal direction (the line III-III direction) and arranged with a predetermined width of gap, so that a constant voltage is applied. Also, the upper electrode 22 is made of a material having a high degree of transparency. In the present embodiment, the upper electrode protection layer 21 is a plastic substrate (resin film) made of polyethylene terephthalate. The upper electrode 22 is a transparent electrode made of indium tin oxide (ITO). The display layer 23 is a glass substrate. Hence, since the upper substrate 20 is made of a transparent member, the upper substrate 20 functions as a display panel through which a user can see the display section 30 from the upper side of the upper substrate 20 (the upper direction in FIG. 2).

Next, the display section 30 will be described. The display section 30 is a space formed by the lower substrate 10, the upper substrate 20, and a spacer 31. The spacer 31 is disposed in the space between the lower substrate 10 and the upper substrate 20 so as to bridge the lower substrate 10 and the upper substrate 20. The spacer 31 uniformly divides the space into a grid to form a plurality of small compartment cells, and supports the upper substrate 10 and the lower substrate 20. The spacer 31 is made from a flexible plate member formed with a plurality of through-holes in a grid shape. For example, the spacer 31 is made of synthetic resin such as polyimide and polyethylene terephthalate.

The display section 30 is filled with charged particles 33a and 33b and dispersion medium 34. The charged particles 33a and 33b are materials that can be electrically charged in the dispersion medium 34. The charged particles 33a and 33b are pigment or dye made of organic or inorganic compound, or pigment or dye covered by a synthetic resin. In the present embodiment, the charged particles 33a are mixture of a styrene resin and titanium dioxide, and have an average particle diameter of 5 μm (7 wt %). The amount of titanium dioxide in the particles is 40 wt %. The charged particles 33b are mixture of a styrene resin and carbon black, and have an average particle diameter of 5 μm (10 wt %). The amount of carbon black in the particles is 30 wt %. Thus, the charged particles 33a have a white color tone, whereas the charged particles 33b have a black color tone. Further, the charged particles 33a and 33b are electrically charged to opposite polarity (positive and negative). In the present embodiment, the white-color charged particles 33a are negatively charged, whereas the black-color charged particles 33b are positively charged.

Usable examples of the dispersion medium 34 include alcohols, hydrocarbons, and silicone oil, which have high insulation capability and low viscosity. In the present embodiment, Isopar (73 wt %) which is a paraffin-base solvent manufactured by Exxon Mobile Corporation is used as the dispersion medium 34. Note that the dispersion medium 34 contains ethanol (10 wt %) as additive.

A mask section 40 is provided on the upper surface of the upper substrate 20 (the surface which does not confront the lower substrate 10) for masking a peripheral part of the display section 30 where no small compartment cells exist, so that the user cannot see the peripheral part when viewed from the upper side. The mask section 40 is provided along the four sides of the upper substrate 20 with a constant width. In other words, the mask section 40 is a squared ring shape plate member formed with a through-hole so that the user can see the display section 30. The mask section 40 is provided by affixing a painted synthetic resin such as polyethylene terephthalate or by forming an ink layer on the upper surface of the display layer 23. With this configuration, when the image display device 1 (the display panel 2) is viewed from its upper side (top side), the display section 30 can be seen through the through-hole formed in the mask section 40.

Figure 4A:
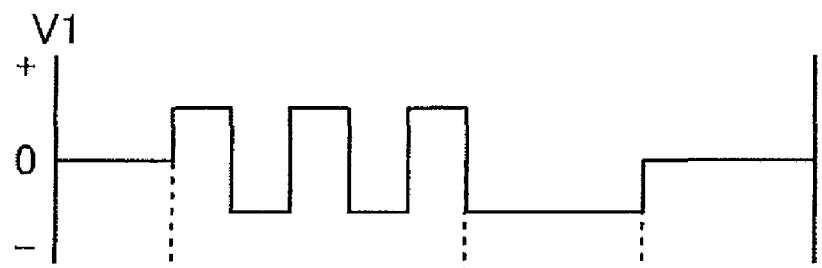
Figure 4B:
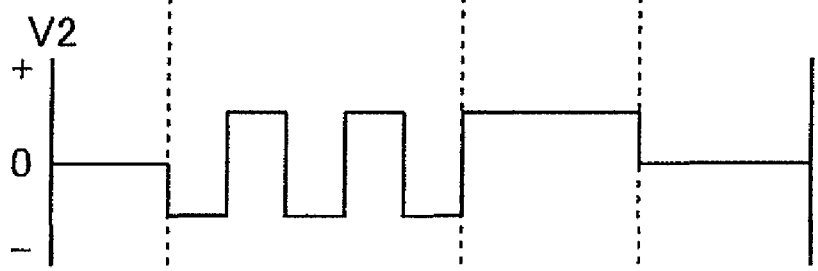
Figure 4C:
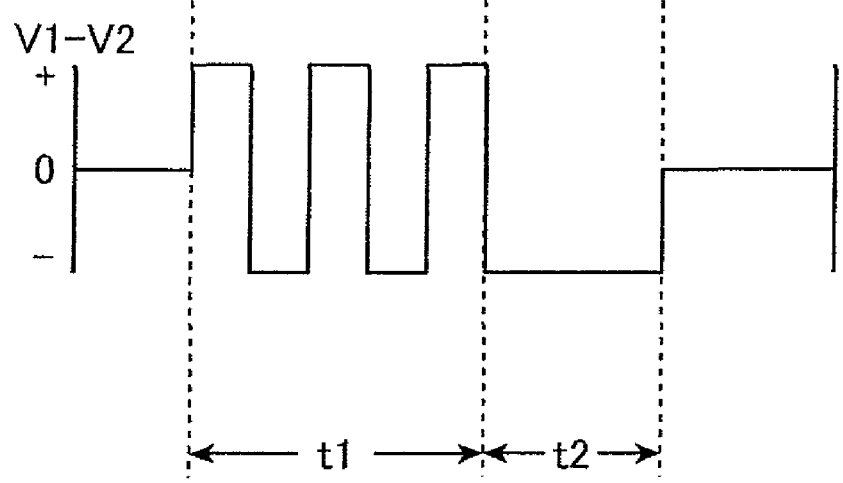

Next, control for applying voltages during a refresh operation and an image forming operation will be described while referring to FIGS. 4A through 4C. FIGS. 4A through 4C are timing charts for showing an example of a voltage V1 applied to the upper electrode 22 during the refresh operation and the image forming operation, a voltage V2 applied to the lower electrode 12 during the same operations, and a potential difference V1-V2 between the upper electrode 22 and the lower electrode 12 during the same operations, wherein FIG. 4A shows the voltage V1, FIG. 4B shows the voltage V2, and FIG. 4C shows the potential difference V1-V2.

As shown in FIGS. 4A through 4C, after the refresh operation is executed during a time period t1, the image forming operation is executed during a time period t2. During the refresh operation according to the present embodiment, voltages are applied such that the white color charged particles 33a, the black color charged particles 33b, the white color charged particles 33a, the black color charged particles 33b, and the white color charged particles 33a migrate to the upper substrate 20 side in this order. Conversely, the black color charged particles 33b, the white color charged particles 33a, the black color charged particles 33b, the white color charged particles 33a, and the black color charged particles 33b migrate to the lower substrate 10 side in this order.

In this way, during the refresh operation according to the present embodiment, voltages are applied so that the charged particles 33 migrate five times between the upper substrate 20 and the lower substrate 10.

A time period t1/5 during which a voltage is applied so that the charged particles 33 migrate one time in the refresh operation is set to a time period shorter than the time period t2. The time period t1/5 is set to such a time period that the charged particles 33 do not adhere to the substrates even if the potential difference V1-V2 is applied between the electrodes in a state where gray degradation has occurred.

Figure 5:
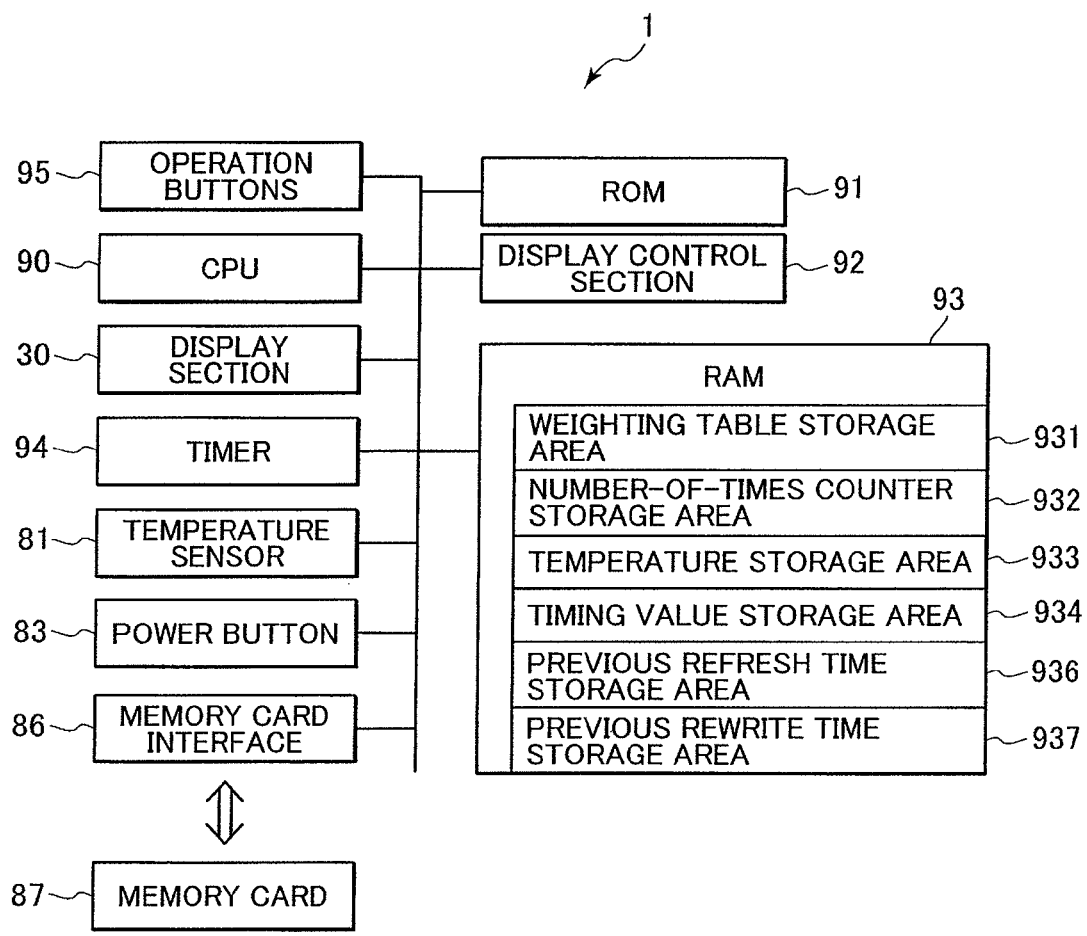
FIG. 5 is a block diagram showing the electrical configuration of the image display device according to the first embodiment.

Next, the electrical configuration of the image display device 1 will be described. FIG. 5 is a block diagram showing the electrical configuration of the image display device 1. As shown in FIG. 5, the control unit 3 (see FIG. 1) of the image display device 1 includes a CPU 90 that controls the image display device 1, a ROM 91 that stores programs and the like executed by the CPU 90, a display control section 92 that controls contents displayed on the display section 30, a RAM 93 that temporarily stores data, a timer 94 that measures time and that inputs the time to the CPU 90, operation buttons 95, a temperature sensor 81, a power button 83, and a memory card interface 86 that functions as an interface with a memory card 87, all of which are connected to one another via a bus. Note that the temperature sensor 81 functions as an example of the temperature detecting section.

The memory card 87 stores contents data including a plurality of image data for each page. The control unit 3 is provided with a memory card slot (not shown) into which the memory card 87 can be inserted. The CPU 90 executes reading, writing, and the like the contents data in the memory card 87 inserted in the memory card slot, via the memory card interface 86. The memory card 87 may store a plurality of contents data.

The operation buttons 95 receive a screen rewrite operation inputted by a user for instructing rewriting of image data that is currently displayed, then transmit to the CPU 90 an image forming request that is an instruction signal in response to the screen rewrite operation. For example, the screen rewrite operation includes a page turning operation for turning pages that are displayed, a content switching operation for switching contents that are displayed, and operations for displaying predetermined screens such as a contents list screen displaying a list of contents data stored in the memory card 87 and a setting screen for performing various settings of the image display device 1.

The CPU 90 executes the above-mentioned image forming operations based on the contents of next image data to be displayed on the display panel 2, in accordance with the image forming request.

The RAM 93 includes a weighting table storage area 931, a number-of-times counter storage area 932, a temperature storage area 933, a timing value storage area 934, a previous refresh time storage area 936, a previous rewrite time storage area 937, and other storage areas (not shown). The weighting table storage area 931 stores a weighting table for determining timing at which a refresh operation is executed. The number-of-times counter storage area 932 stores a counter for counting the number of times the image forming operations are executed since the previous refresh operation was executed. The temperature storage area 933 stores ambient temperature detected by the temperature sensor 81. The timing value storage area 934 stores a timing value for determining timing at which a refresh operation is executed, the timing value being calculated based on the number of times the image forming operations are executed and on the detected temperature. The previous refresh time storage area 936 stores time at which the previous refresh operation was executed. The previous rewrite time storage area 937 stores time at which the previous image forming operation was executed.

Figure 6:
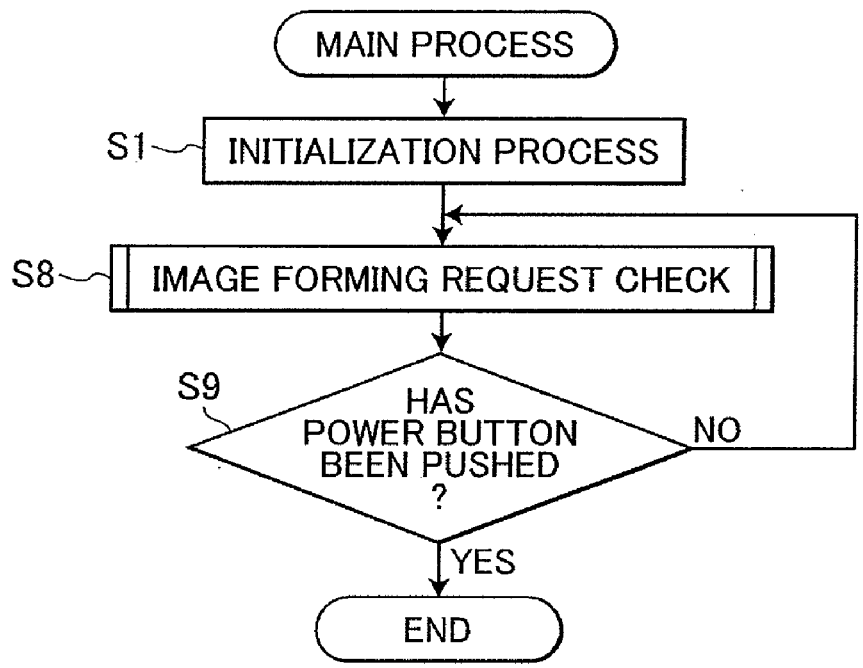
FIG. 6 is a flowchart of a main process executed in the image display device according to the first embodiment.
Figure 7:
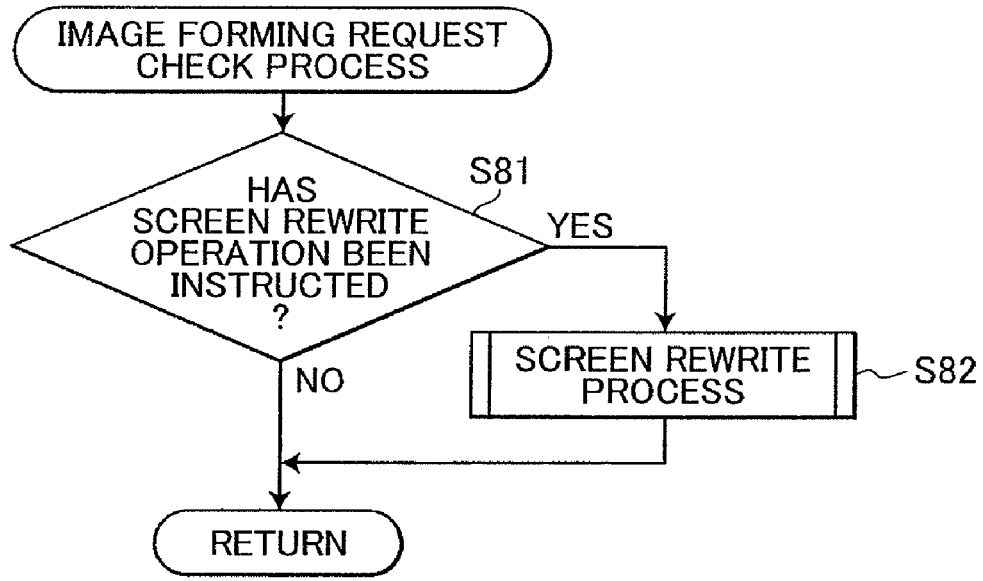
FIG. 7 is a flowchart of an image forming request check process executed in the main process.
Figure 8:
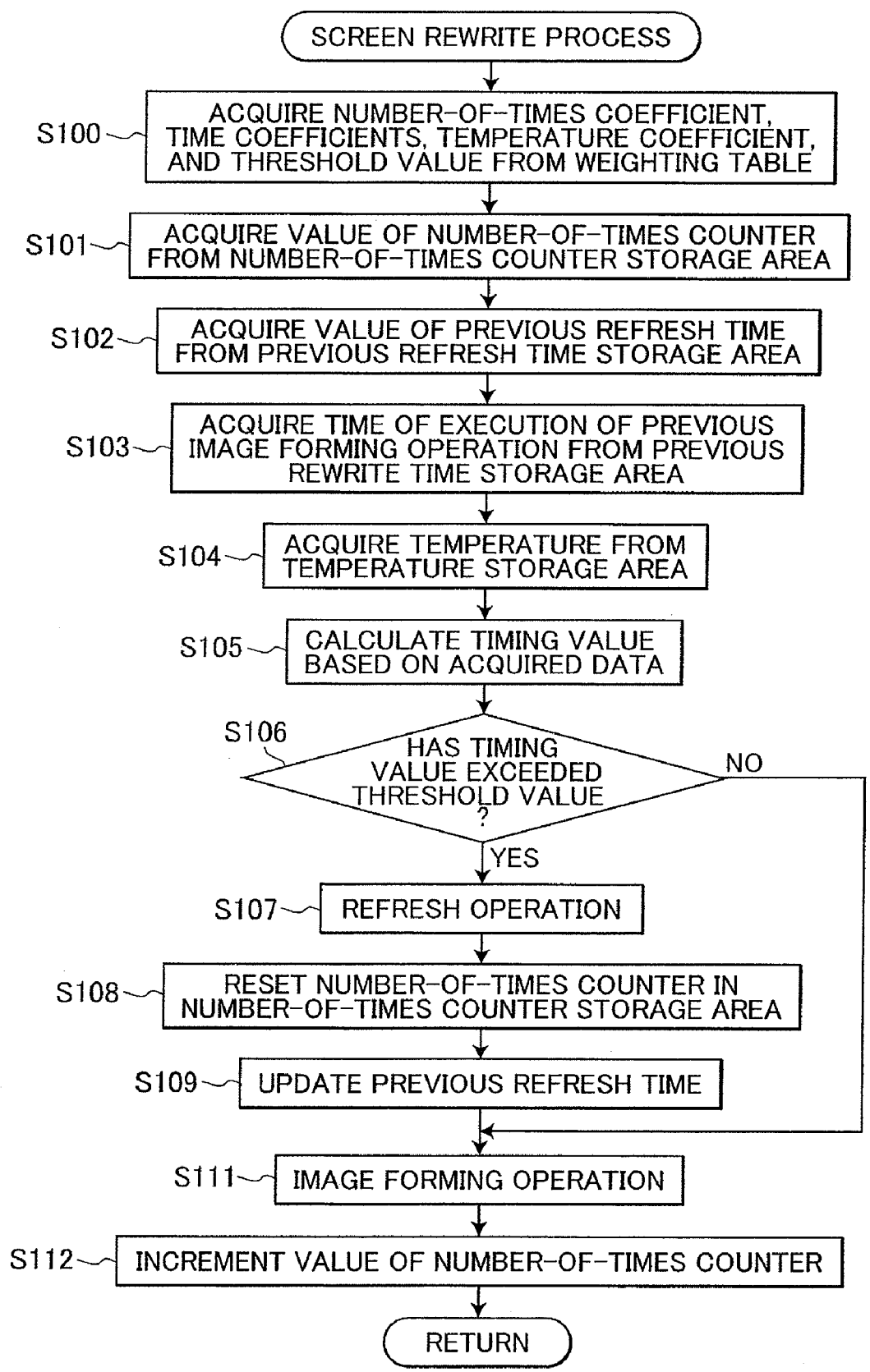
FIG. 8 is a flowchart of a screen rewrite process executed in the image forming request check process.

Next, with the above-described configuration, operations executed by the image display device 1 will be described while referring to FIGS. 6 through 8. FIG. 6 is a flowchart of a main process executed in the image display device 1. FIG. 7 is a flowchart of an image forming request check process executed in the main process. FIG. 8 is a flowchart of a screen rewrite process executed in the image forming request check process.

As shown in FIG. 6, when the power button 83 is pushed to turn the power on, the main process is started. First, the CPU 90 executes an initialization process for initializing (resetting) each storage area in the RAM 93, and displays a menu screen on the display panel 2 (S1).

Next, the CPU 90 checks whether an image forming request for forming an image on the display section 30 has been given, and executes the image forming request check process in which the image forming operation is executed if the image forming request has been given (S8). The image forming request check process will be described later in greater detail while referring to FIGS. 7 and 8.

Next, the CPU 90 determines whether the power button 83 has been pushed (S9). If the power button 83 has been pushed (S9: YES), then the main process ends. If the power button 83 has not been pushed (S9: NO), then the CPU 90 returns to S8 to repeat the process.

Next, the image forming request check process executed in the main process will be described while referring to FIGS. 7 and 8. First, the CPU 90 determines whether a screen rewrite operation has been instructed by the operation buttons 95 (S81). If the screen rewrite operation has been instructed (S81: YES), the CPU 90 executes the screen rewrite process (S82 and FIG. 8) and returns to the main process. If the screen rewrite operation has not been instructed (S81: NO), the CPU 90 returns directly to the main process.

Next, as shown in FIG. 8, in the screen rewrite process, the CPU 90 acquires a number-of-times coefficient (Count), two time coefficients including an image forming time coefficient (TimeW) and a refresh time coefficient (TimeR), a temperature coefficient (Temp), and a threshold value of a timing value (Thre) from the weighting table stored in the weighting table storage area 931 (S100).

Next, the CPU 90 acquires a value of the number-of-times counter (count) stored in the number-of-times counter storage area 932 (S101). Then, the CPU 90 acquires a value of the previous refresh time (prev_refresh_time) stored in the previous refresh time storage area 936 (S102). Then, the CPU 90 acquires time at which the previous image forming operation was executed (prev_write_time) stored in the previous rewrite time storage area 937 (S103).

Next, the CPU 90 acquires temperature (temp) stored in the temperature storage area 933 (S104). Note that the temperature sensor 81 measures temperature at a predetermined time interval (for example, time interval of five seconds), and the measured temperature is stored in the temperature storage area 933. The temperature storage area 933 always stores the latest updated temperature.

Next, the CPU 90 calculates a timing value (TimingVal) using the coefficients acquired in S100 and the values acquired in S101 through S104 (S105). Here, the CPU 90 calculates the timing value based on equation (1) shown below, using a first elapsed time that is a time elapsed from the previous image forming operation until the current time (current_time) at which the image forming request has been given.

$$\text{TimingVal}=\text{Time}W*(\text{current\_time}-\text{prev\_write\_time}) \quad (1)$$

In this way, since the refresh operation is executed in consideration of the elapsed time since the previous image forming operation, adhesion of particles due to execution of an image forming operation in gray degradation can be prevented.

Alternatively, the CPU 90 may calculate the timing value based on equation (2) shown below, using both the first elapsed time that is a time period elapsed since the previous image forming operation and a second elapsed time that is a time period elapsed since the previous refresh operation.

$$\text{TimingVal}=\text{Time}W*(\text{current\_time}-\text{prev\_write\_time})+ \\ \text{Time}R*(\text{current\_time}-\text{prev\_refresh\_time}) \quad (2)$$

In this way, the refresh operation is executed in consideration of the second elapsed time since the previous refresh operation in addition to the first elapsed time since the previous image forming operation. Hence, not only adhesion of particles due to execution of an image forming operation in gray degradation can be prevented, but also adhesion of particles due to repetition of image forming operations can be prevented.

Alternatively, the CPU 90 may calculate the timing value based on equation (3) shown below, using the number of times the image forming operations have been executed from the previous refresh operation until the current time, in addition to the first and second elapsed times.

$$\text{TimingVal}=\text{Time}W*(\text{current\_time}-\text{prev\_write\_time})+ \\ \text{Time}R*(\text{current\_time}-\text{prev\_refresh\_time})+ \\ (\text{Count}*\text{count}) \quad (3)$$

In this way, the refresh operation is executed in consideration of the number of times the image forming operations have been executed since the previous refresh operation, in addition to the first elapsed time since the previous image forming operation and the second elapsed time since the previous refresh operation. Hence, not only adhesion of particles due to execution of an image forming operation in gray degradation can be prevented, but also adhesion of particles due to repetition of image forming operations can be prevented more reliably. Further, the refresh operation can also be executed even when the number of times image forming operations were executed up to that time is few.

Alternatively, the CPU 90 may calculate the timing value based on equation (4) shown below, using the temperature (temp) stored in the temperature storage area 933.

$$\text{TimingVal}=\text{Time}W*(\text{current\_time}-\text{prev\_write\_time})+ \\ \text{Time}R*(\text{current\_time}-\text{prev\_refresh\_time})+ \\ (\text{Count}*\text{count})+\text{Temp}*\text{temp} \quad (4)$$

In this way, the refresh operation is executed in consideration of the ambient temperature of the display panel 2, in addition to the first elapsed time since the previous image forming operation, the second elapsed time since the previous refresh operation, and the number of times the image forming operations have been executed since the previous refresh operation. Charged particles tend to migrate when the temperature is higher. Hence, in the electrophoretic display device in which white charged particles are dispersed in dispersion medium made of black liquid, for example, the charged particles displaying white color tend to change gradually to gray color at locations with high temperature (gray degradation). If an image forming operation is executed in a state of gray degradation, the charged particles adhere to the substrate. In equation (4) shown above, however, the timing of the refresh operation is determined in consideration of temperature information. Hence, not only adhesion of particles due to execution of an image forming operation in gray degradation and adhesion of particles due to repetition of image forming operations can be prevented, but also gray degradation at locations with high temperature can be coped with.

In equations (1) through (4) shown above, the timing value is calculated by multiplying weights (TimeW, TimeR, Count, and/or Temp) by respective base values (current_time−prev_write_time, current_time−prev_refresh_time, count, and/or temp). Effects on the timing value by the base values can be adjusted by changing the respective weights. For example, effects on the timing value by the first elapsed time can be made larger by increasing TimeW.

Then, the CPU 90 determines whether the timing value calculated in S105 exceeds the threshold value acquired in S100 (i.e., whether an inequality TimingVal>Thre is satisfied) (S106). If the timing value exceeds the threshold value (S106: YES), the CPU 90 executes the refresh operation (S107) judging that the refresh operation should be performed based on the first elapsed time, the second elapsed time, the number of times of image forming operations since the previous refresh operation, and/or the current temperature. Then, the CPU 90 resets the value of the number-of-times counter stored in the number-of-times counter storage area 932 to zero (S108). Then, the CPU 90 updates the previous refresh time (S109).

The CPU 90 then executes the image forming operation on the display section 30 in accordance with the image forming request (S111), and updates the previous rewrite time. Since the image forming operation has been executed one time after execution of the refresh operation (S107), the CPU 90 increments the value of the number-of-times counter by one (S112) and returns to the image forming request check process.

If the timing value does not exceed the threshold value (S106: NO), the CPU 90 directly goes to S111 to execute the image forming operation on the display section 30 in accordance with the image forming request, and updates the time stored in the previous rewrite time storage area 937 (S111). Then, since the image forming operation has been executed, the CPU 90 increments the value of the number-of-times counter by one (S112) and returns to the image forming request check process.

As described above, according to the image display device of the present embodiment, timing of the refresh operation is determined in consideration of at least the first elapsed time since the previous image forming operation. Accordingly, performing an image forming operation in gray degradation can be prevented. Further, if the second elapsed time since the previous refresh operation is taken into consideration, adhesion of particles due to repetition of image forming operations can be prevented. Further, if the number of times of executing image forming operations since the previous refresh operation is taken into consideration in addition to the first and second elapsed times, adhesion of particles due to repetition of image forming operations can be prevented more reliably. Further, if the ambient temperature of the display panel 2 is taken into consideration in addition to the first and second elapsed times and the number of times of executing image forming operations, gray degradation at locations with high temperature can be coped with.

Note that, in the above-described embodiment, the CPU 90 that executes the image forming operation in S111 of FIG. 8 functions as the image forming section. The CPU 90 that executes the refresh operation in S107 of FIG. 8 functions as the refresh controlling section. The CPU 90 that increments the value of the number-of-times counter in S112 of FIG. 8 functions as the image-formation-times counting section. The CPU 90 that determines whether the timing value exceeds the threshold value in S106 of FIG. 8 functions as the refresh determining section.

Next, an electrophoretic display device according to a second embodiment of the invention will be described while referring to FIGS. 9 through 16, wherein like parts and components are designated by the same reference numerals to avoid duplicating description. The electrophoretic display device of the second embodiment is applied to an image display device 101.

Figure 9:
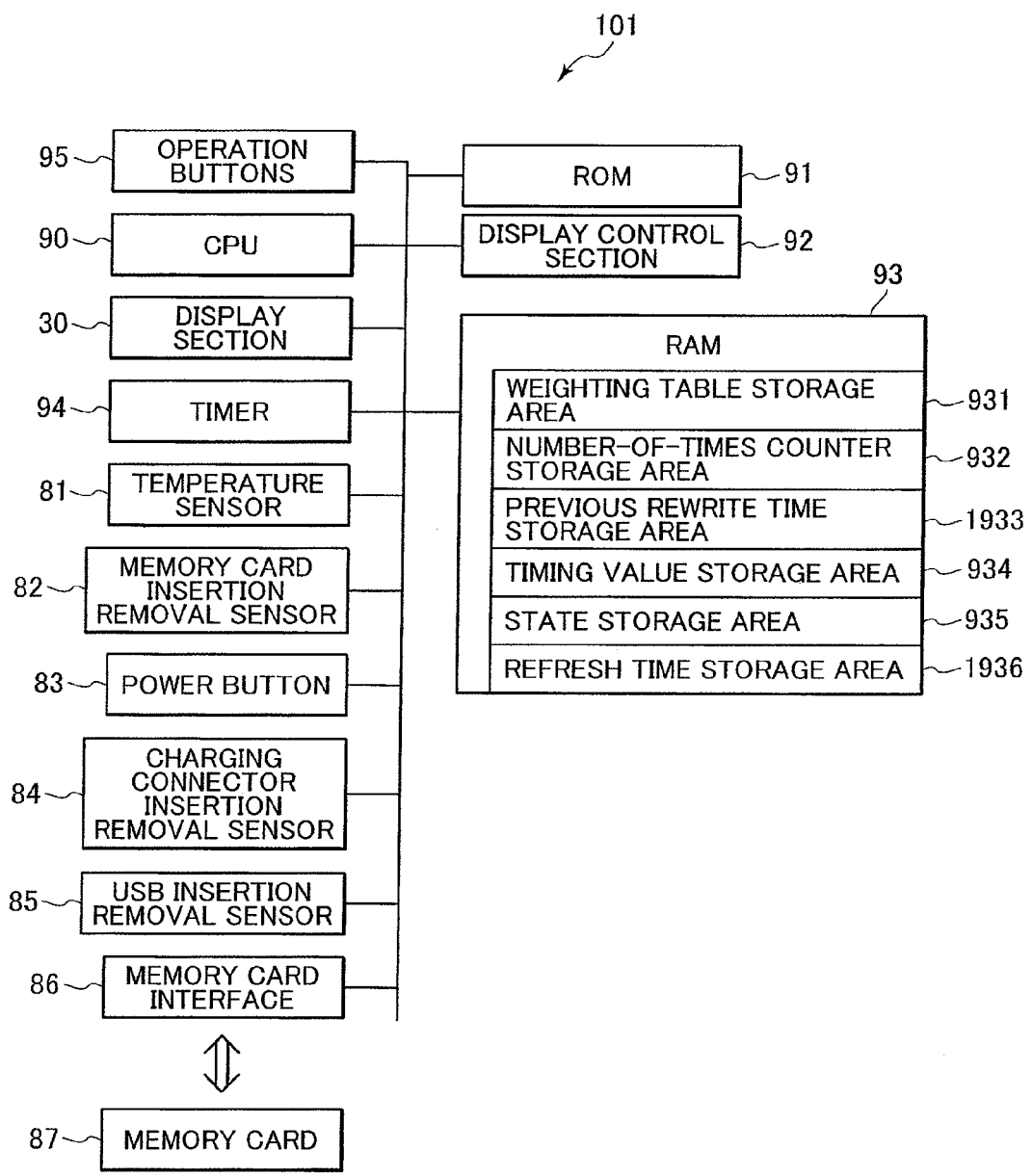
FIG. 9 is a block diagram showing the electrical configuration of an image display device according to a second embodiment.

First, the electrical configuration of the image display device 101 will be described. FIG. 9 is a block diagram showing the electrical configuration of the image display device 101. As shown in FIG. 9, the control unit 3 (see FIG. 1 in the first embodiment) of the image display device 101 includes the CPU 90 that controls the image display device 101, the ROM 91 that stores programs and the like executed by the CPU 90, the display control section 92 that controls contents displayed on the display section 30, the RAM 93 that temporarily stores data, the timer 94 that measures time and inputs the time to the CPU 90, the operation buttons 95, the temperature sensor 81, a memory card insertion removal sensor 82, the power button 83, a charging connector insertion removal sensor 84, a USB insertion removal sensor 85, and the memory card interface 86 that functions as an interface with the memory card 87, all of which are connected to one another via a bus.

The control unit 3 is provided with a memory card slot (not shown). The memory card insertion removal sensor 82 detects whether the memory card 87 storing image data that can be displayed on the display section has been inserted into or removed from the memory card slot (not shown).

The memory card 87 stores contents data including a plurality of image data for each page. The display panel 2 displays image data for one page among the contents data stored in the memory card 87. The memory card 87 may store a plurality of contents data. The CPU 90 executes reading, writing, and the like of the contents data in the memory card 87 inserted in the memory card slot, via the memory card interface 86.

The power button 83 is for turning on and off the power of the image display device 101. The charging connector insertion removal sensor 84 detects whether a charging connector of the image display device 101 has been inserted or removed. The USB insertion removal sensor 85 detects whether a USB connector for connection with a PC has been inserted or removed.

Note that the temperature sensor 81 functions as the temperature detecting section. The memory card insertion removal sensor 82, the power button 83, the charging connector insertion removal sensor 84, the USB insertion removal sensor 85, and the operation buttons 95 function as the detecting section.

The operation buttons 95 receive various operations inputted by a user, and then transmit to the CPU 90 instruction signals in response to the various operations. For example, the various operations include a refresh operation in which the CPU 90 executes a refresh operation at an arbitrary timing set by the user, a screen rewrite operation for executing rewrite of image data that is displayed on the display panel 2, and the like.

The screen rewrite operation includes a page turning operation for turning pages that are displayed, a content switching operation for switching contents that are displayed, and operations for displaying predetermined screens such as a contents list screen displaying a list of contents data stored in the memory card 87 and a setting screen for performing various settings of the image display device 101. When the screen rewrite operation is instructed, an image forming request is transmitted to the CPU 90, the image forming request being an instruction signal for forming an image in association with the respective screen rewrite operations. The CPU 90 executes the above-mentioned image forming operation based on the contents of image data to be displayed next on the display panel 2 in accordance with the image forming request.

The RAM 93 includes the weighting table storage area 931, the number-of-times counter storage area 932, a previous rewrite time storage area 1933, the timing value storage area 934, a state storage area 935, a refresh time storage area 1936, and other storage areas (not shown). The weighting table storage area 931 stores a weighting table for determining timing at which a refresh operation is executed in a screen rewrite process to be described later. The number-of-times counter storage area 932 stores a counter for counting the number of times the image forming operations are executed on the display section 30 since the previous refresh operation was executed. The previous rewrite time storage area 1933 stores time at which the previous image forming operation was executed. The timing value storage area 934 stores a timing value for determining timing at which a refresh operation is executed. The state storage area 935 stores a current state of the image display device 101, such as whether the memory card 87 is inserted, whether charging is performed, and whether USB is connected. The refresh time storage area 1936 stores time at which the previous refresh operation was executed.

The image display device 101 can be operated in the following five modes. In a first mode, the timing of the refresh operation is controlled based on display contents of an image that is formed upon the image forming request. In a second mode, the timing of the refresh operation is controlled based both on the number of times the image forming operations are executed after the previous refresh operation and on display contents of an image that is formed upon the image forming request. In a third mode, the timing of the refresh operation is controlled based both on a first elapsed time measured from the previous image forming operation until the current image forming request and on display contents of an image that is formed upon the image forming request. In a fourth mode, the timing of the refresh operation is controlled based both on a second elapsed time measured from the previous refresh operation until the current image forming request and on display contents of an image that is formed upon the image forming request. In a fifth mode, the timing of the refresh operation is controlled based both on an ambient temperature at the image forming request and on display contents of an image that is formed upon the image forming request. The image display device 101 is provided with a mode switching button (not shown), by which one mode can be selected from among the above-described five modes.

Figure 10:
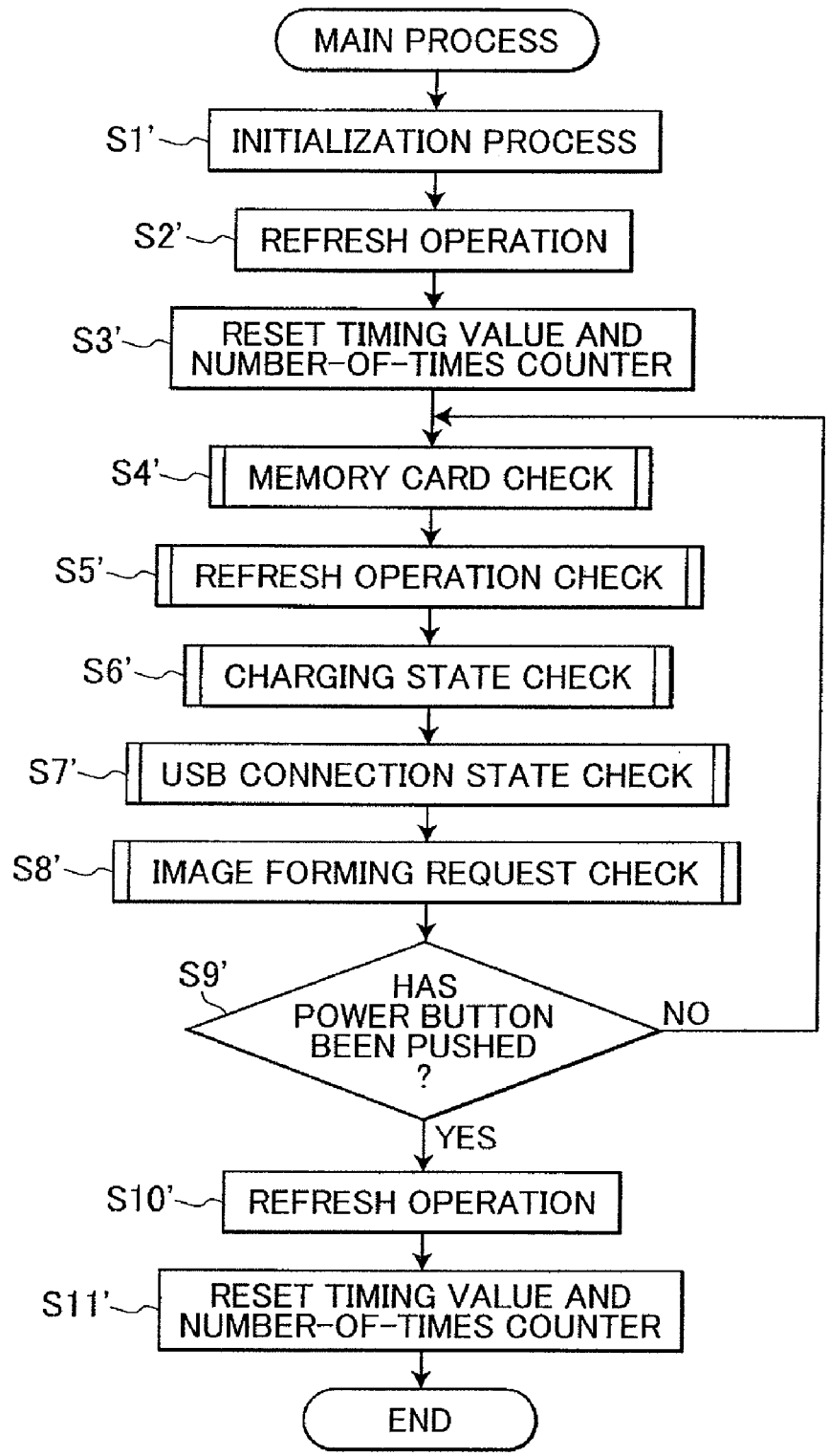
FIG. 10 is a flowchart of a main process executed in the image display device according to the second embodiment.
Figure 11:
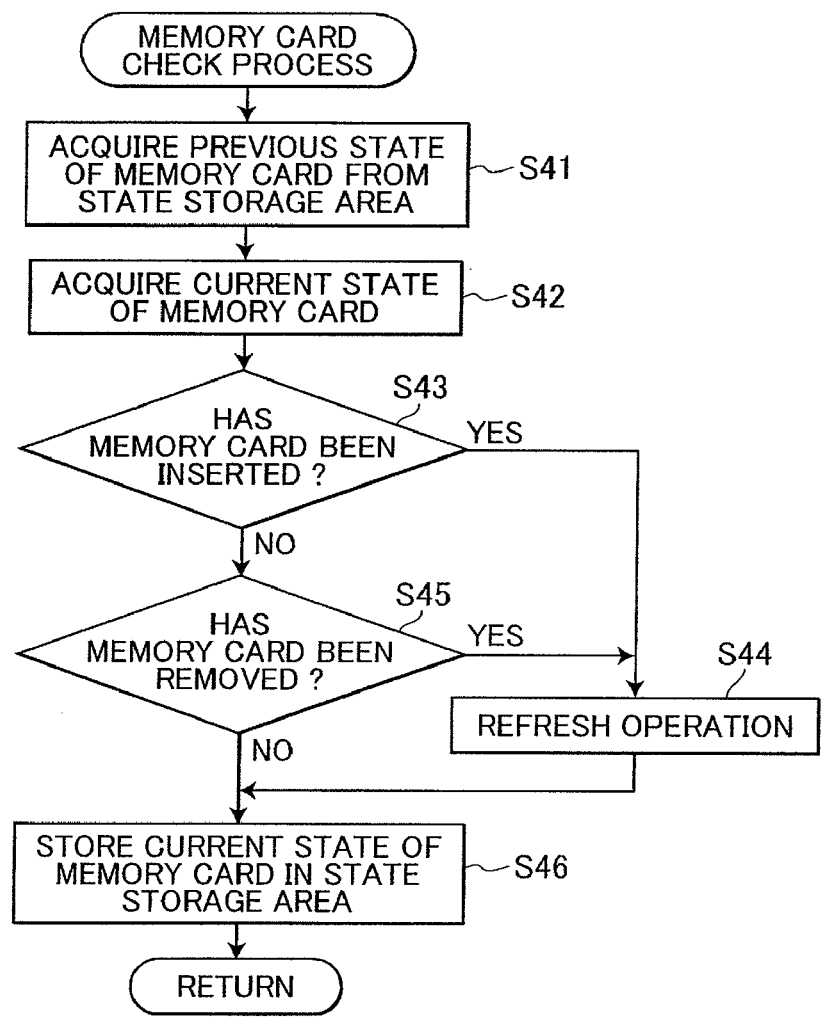
FIG. 11 is a flowchart of a memory card check process executed in the main process.
Figure 12:
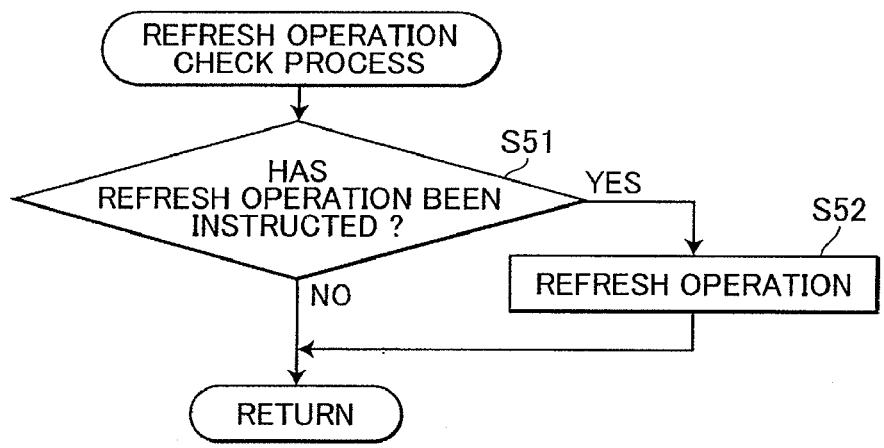
FIG. 12 is a flowchart of a refresh operation check process executed in the main process.
Figure 13:
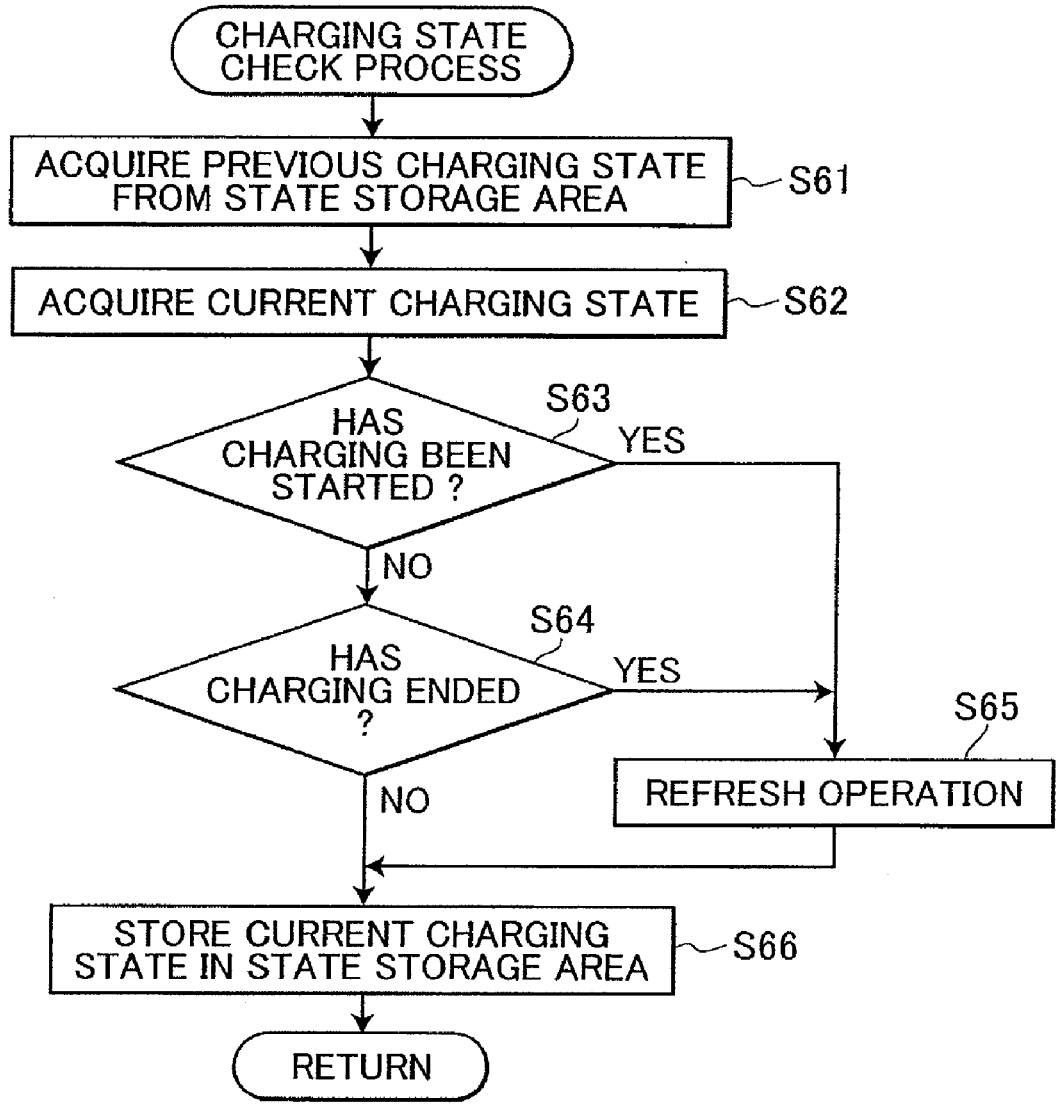
FIG. 13 is a flowchart of a charging state check process executed in the main process.
Figure 14:
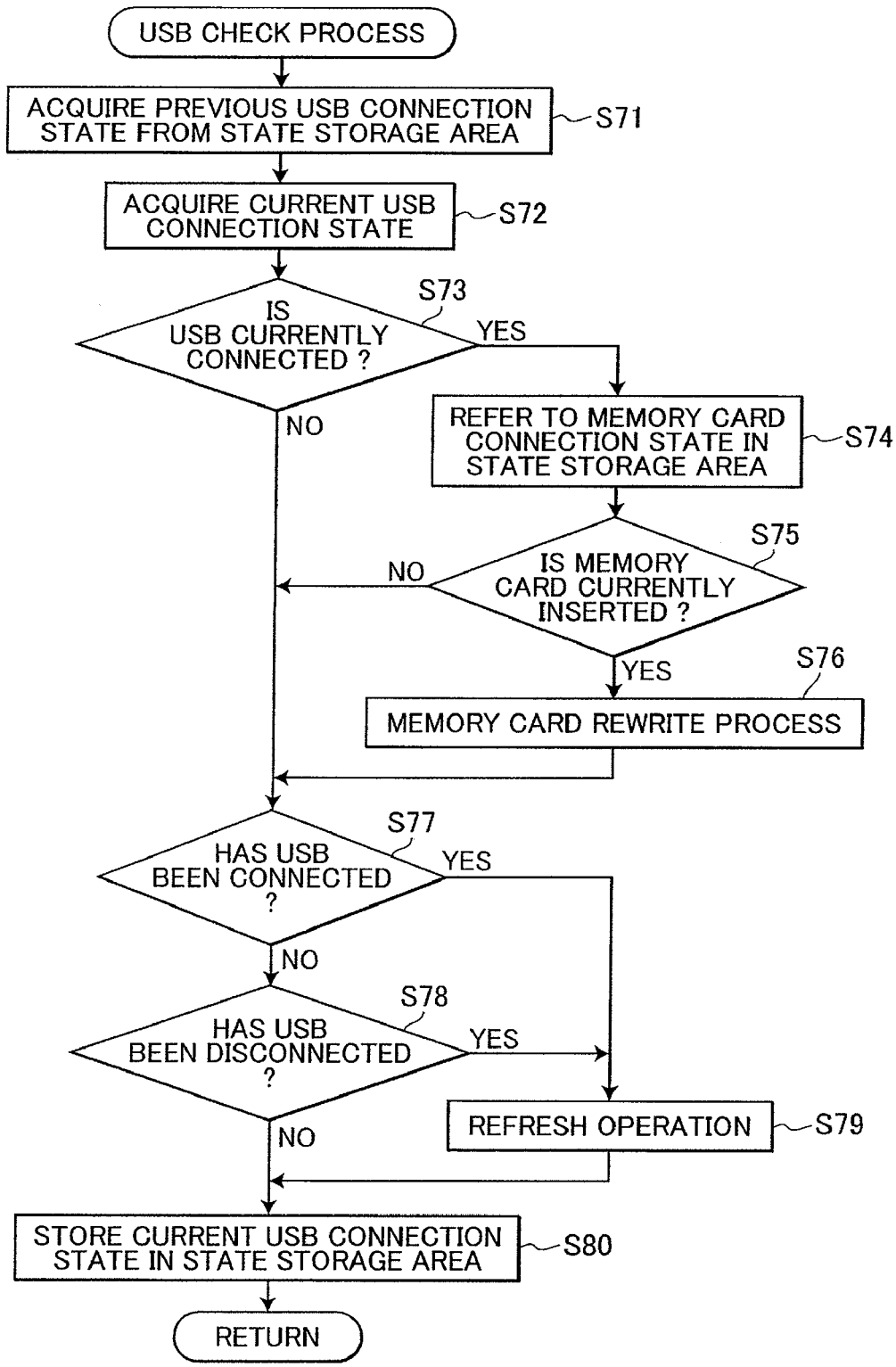
FIG. 14 is a flowchart of a USB check process executed in the main process.
Figure 15:
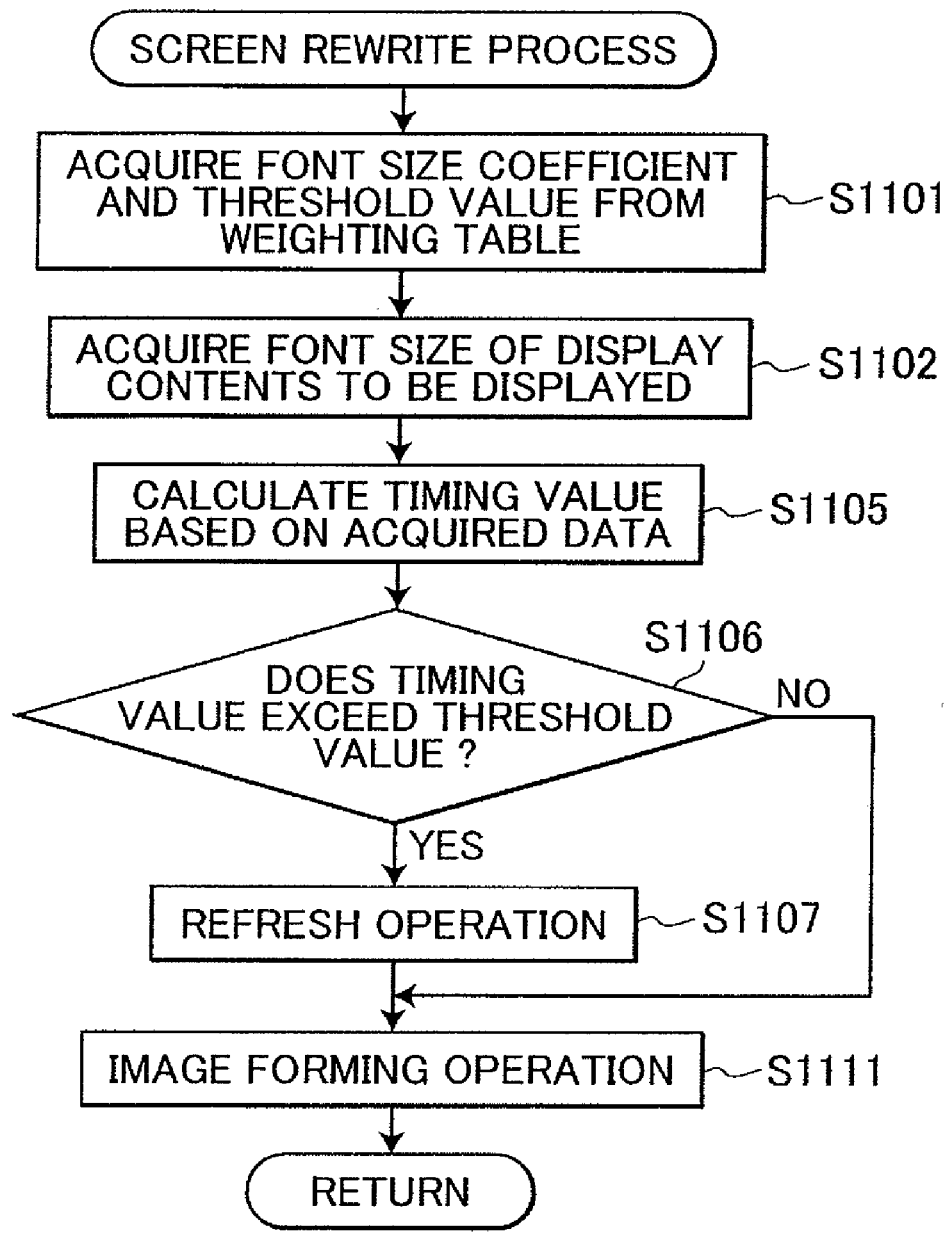
FIG. 15 is a flowchart of a screen rewrite process executed in the image forming request check process.

First, operations executed by the image display device 101, where the first mode is selected, are described while referring to FIGS. 10 through 15. FIG. 10 is a flowchart of a main process executed by the image display device 101. FIG. 11 is a flowchart of a memory card check process executed in the main process. FIG. 12 is a flowchart of a refresh operation check process executed in the main process. FIG. 13 is a flowchart of a charging state check process executed in the main process. FIG. 14 is a flowchart of a USB check process executed in the main process. FIG. 15 is a flowchart of a screen rewrite process executed in an image forming request check process.

As shown in FIG. 10, when the power button 83 is pushed to turn the power on, the main process begins. First, the CPU 90 executes an initialization process for initializing (resetting) the state storage area 935 and the like (S1'). Next, the CPU 90 executes a refresh operation (S2'). The CPU 90 reads out refresh data stored in a refresh data memory (not shown) in the RAM 93, and executes the refresh operation based on a refresh operation control signal. More specifically, the refresh operation control signal is transmitted via a driver (not shown), and a voltage is applied between the lower electrode 12 and the upper electrode 22 so that a predetermined electric field is generated at the display panel 2. Consequently, the charged particles 33*a* and 33*b* in the display section 30 are uniformly dispersed.

Next, the CPU 90 resets the timing value stored in the timing value storage area 934 and the value of the number-of-times counter stored in the number-of-times counter storage area 932 (S3'). Next, the CPU 90 executes a memory card check process for determining whether the memory card 87 is inserted into or removed from the memory card slot (not shown) of the image display device 101 (S4'). The memory card check process will be described later in greater detail while referring to FIG. 11.

Next, the CPU 90 executes a refresh operation check process for checking whether the refresh operation is instructed via the operation buttons 95 (S5'). The refresh operation check process will be described later in greater detail while referring to FIG. 12.

Next, the CPU 90 executes a charging state check process fox checking whether charging is started or completed (S6'). The charging state check process will be described later in greater detail while referring to FIG. 13

Next, the CPU 90 executes a USB connection state check process for checking whether the image display device 101 is connected to or disconnected from a PC via USB (S7'). The USB connection state check process will be described later in greater detail while referring to FIG. 14.

Next, the CPU 90 executes an image forming request check process for checking whether an image forming request is made and for executing an image forming operation if the image forming request is made (S8'). The image forming request check process will be described later in greater detail while referring to FIG. 7 in the first embodiment and FIG. 15.

Next, the CPU 90 determines whether the power button has been pushed (S8'). If the power button has been pushed (S9': YES), then the CPU 90 executes the refresh operation (S10'), resets the timing value and the number-of-times counter (S11'), and ends the process. If the power button has not been pushed (S9': NO), the CPU 90 returns to S4' to repeat the processes.

Next, the memory card check process executed in the main process will be described while referring to FIG. 11. First, the CPU 90 acquires a previous state of the memory card 87 (i.e., whether the memory card was inserted in the memory card slot) from the state storage area 935 (S41). Next, the CPU 90 acquires a current state of the memory card 87 from the memory card insertion removal sensor 82 (S42).

Next, the CPU 90 compares the previous state acquired in S41 and the current state acquired in S42, and determines whether the memory card 87 has been inserted (S43). The CPU 90 determines that the memory card 87 has been inserted, only if the previous state indicates that the memory card 87 is not inserted in the slot and the current state indicates that the memory card 87 is inserted in the slot (S43: YES). In this case, since it is expected that the image forming operation will be requested soon, the CPU 90 executes the refresh operation in order to display clear images (S44). In contrast, the CPU 90 does not determine that the memory card 87 has just been inserted in three cases where the memory card 87 is previously inserted and the memory card 87 is currently inserted, the memory card 87 is previously inserted and the memory card 87 is not currently inserted, and the memory card 87 is not previously inserted and the memory card 87 is not currently inserted (S43: NO). In all of these cases, the CPU 90 moves to S45 to be described later.

After executing the refresh operation in S44, the CPU 90 stores the current state acquired in S42 in the state storage area 935 (S46) and returns to the main process.

If the memory card 87 is not inserted from acquisition timing of the previous state to acquisition timing of the current state (S43: NO), the CPU 90 compares the previous state acquired in S41 and the current state acquired in S42, and determines whether the memory card 87 has been removed (S45). If the memory card 87 has been removed (S45: YES), the CPU 90 executes the refresh operation (S44). When the memory card 87 has been removed, it can be presumed that the user temporarily stops using the image display device 101. Thus, the refresh operation consuming a relatively long time can be executed during a time period when the image display device 101 is not used. Next, the CPU 90 stores the current state acquired in S42 into the state storage area 935 (S46) and returns to the main process.

In S43 and S44 described above, the refresh operation is executed only if the CPU 90 determines that the memory card 87 is not previously inserted and is currently inserted. This is because it is expected that the image forming operation will be requested soon, based on contents data stored in the memory card 87.

Next, the refresh operation check process executed in the main process will be described while referring to FIG. 12. First, the CPU 90 determines whether the refresh operation has been instructed via the operation buttons 95 (S51). If the refresh operation has been instructed via the operation buttons 95 (S51: YES), the CPU 90 executes the refresh operation in accordance with the user's request (S52) and returns to the main process. If the refresh operation has not been instructed via the operation buttons 95 (S51: NO), the CPU 90 directly returns to the main process.

Next, the charging state check process executed in the main process will be described while referring to FIG. 13. First, the CPU 90 acquires a previous charging state (i.e., whether charging is performed) from the state storage area 935 (S61). Next, the CPU 90 acquires a current charging state from the charging connector insertion removal sensor 84 (S62). Next, the CPU 90 compares the previous charging state acquired in S61 and the current charging state acquired in S62, and determines whether a charging connector has been inserted and charging has been started (S63). If charging has been started (S63: YES), the CPU 90 executes the refresh operation (S65). When charging has been started, it can be presumed that the user temporarily stops using the image display device 101. Thus, the refresh operation consuming a relatively long time can be executed during a time period when the image display device 101 is not used. Next, the CPU 90 stores the current charging state acquired in S62 into the state storage area 935 (S66) and returns to the main process.

If charging has not been started (S63: NO), the CPU 90 determines whether charging has ended based on whether the charging connector has changed from an inserted state to a removed state (S64). If charging has ended (S64: YES), the CPU 90 executes the refresh operation (S65). Note that there is no need to check whether a necessary electric power remains in the image display device 101, because the image display device 101 holds an electric power required for the refresh operation when charging is completed. If charging has not ended (S64: NO), then the CPU 90 stores the current charging state acquired in S62 in the state storage area 935 (S66) and returns to the main process.

Next, the USB check process executed in the main process will be described while referring to FIG. 14. First, the CPU 90 acquires a previous connection state of USB (i.e., whether USB is connected) from the state storage area 935 (S71). Next, the CPU 90 acquires a current connection state of USB from the USB insertion removal sensor 85 (S72).

Next, the CPU 90 determines whether the current connection state is a connected state (S73). If the USB is in a connected state (S73: YES), the CPU 90 refers to the state storage area 935 (S74) and determines whether the memory card is currently in an inserted state (S75).

If the memory card is currently in an inserted state (S75: YES), the CPU 90 starts a memory card rewrite process for writing contents data in a PC into the memory card 87 and for erasing contents data in the memory card 87 via the USB and the memory card interface 86, in accordance with an instruction from a PC (S76).

The memory card rewrite process (S76) is not described here in detail since the process is not directly related to the present invention. In the memory card rewrite process, the contents stored in the memory card 87 can be rewritten in accordance with an instruction from the PC as described above. When the memory card rewrite process (S76) ends, the CPU 90 moves to S77 described later.

If the CPU 90 determines that the USB is not in a connected state (S73: NO), the CPU 90 moves to S77 described later. Also, if the CPU 90 determines that the memory card is not currently in an inserted state (S75: NO), the CPU 90 moves to S77 described later.

Next, the CPU 90 compares the previous connection state acquired in S71 and the current connection state acquired in S72, and determines whether the connection state has changed from a state where the USB is not connected to a state where the USB is connected (s77). If the connection state has changed from a state where the USB is not connected to a state where the USB is connected (i.e., the previous connection state is a state where the USB is not connected and the current connection state is a state where the USB is connected) (S77: YES), the CPU 90 executes the refresh operation (S79). When the USB has been connected, it can be presumed that the user wishes to transmit to or receive from the PC some data and that the user temporarily stops using the image display device 101. Thus, the refresh operation consuming a relatively long time can be executed during a time period when the image display device 101 is not used. Next, the CPU 90 stores the current connection state acquired in S72 in the state storage area 935 (S80) and returns to the main process.

If the connection state has not changed from a state where the USB is not connected to a state where the USB is connected (i.e., in any one of the following cases where the USB is not previously connected and is not currently connected, or the USB is previously connected and is currently connected, or the USB is previously connected and is not currently connected) (S77: NO), the CPU 90 compares the previous connection state acquired in S71 and the current connection state acquired in S72, and determines whether the connection state has changed from a state where the USB is connected to a state where the USB is not connected (S78). If the USB has been disconnected (i.e., the USB is previously connected and is not currently connected) (S78: YES), the CPU 90 executes the refresh operation (S79) since it is expected that the image forming operation will be requested. Then, the CPU 90 stores the current connection state acquired in S72 in the state storage area 935 (S80) and returns to the main process.

If the USB has not been disconnected (i.e., in either one of the cases where the USB is not previously connected and is not currently connected, or the USB is previously connected and is currently connected) (S78: NO), the CPU 90 stores the current connection state acquired in S72 in the state storage area 935 (S80) and returns to the main process.

As describe above, the refresh operation is executed (S79) if a determination is made that the USB has been disconnected (S78: YES). This is because, when the USB has been disconnected, it is expected that the image forming operation will be requested soon. More specifically, the user does not execute the screen rewrite operation very often when the USB is connected and the memory card rewrite process is being executed, whereas the user often executes the screen rewrite operation when the USB is disconnected and the image display device 101 is carried for use.

Next, the image forming request check process executed in the main process will be described while referring to FIG. 7 in the first embodiment and FIG. 15. First, the CPU 90 determines whether the screen rewrite operation has been instructed via the operation buttons 95 (S81 in FIG. 7) If the screen rewrite operation has been instructed (S81: YES), then the CPU 90 executes the screen rewrite process (S82, FIG. 15) and returns to the main process. If the screen rewrite operation has not been instructed (S81: NO), then the CPU 90 directly returns to the main process.

In the screen rewrite process, as shown in FIG. 15, first the CPU 90 acquires a font size coefficient (Fontsize) and a threshold value of the timing value (Thre) from a weighting table stored in the weighting table storage area 931 (S1101). Next, the CPU 90 acquires a font size (fontsize) of display contents to be displayed (S1102). For example, if font size information is added to display data as meta data, the CPU 90 reads and acquires the meta data.

Next, the CPU 90 calculates the timing value (TimingVal) using both the coefficient acquired in S1101 and the value acquired in S1102 (S1105). Here, the timing value is calculated based on equation (5) shown below.

$$TimingVal=1.0/(Fontsize*fontsize) \tag{5}$$

The CPU 90 then determines whether the timing value calculated in S1105 exceeds the threshold value acquired in S1101 (i.e., whether an inequality TimingVal>Thre is satisfied) (S1106). If the timing value exceeds the threshold value (S1106: YES), the CPU 90 executes the refresh operation (S1107) as it determines that it is now the timing when the refresh operation should be performed based on the display contents. Next, the CPU 90 executes the image forming operation on the display section 30 in accordance with the request (S1111).

If the timing value does not exceed the threshold value (S1106: NO), the CPU 90 proceeds directly to S1111 and executes the image forming operation on the display section 30 in accordance with the request (S1111). Then, the CPU 90 returns to the image forming request check process.

Note that, according to the above-described method for calculating the timing value in S1105, the refresh operation is more likely to be executed when the font size of displayed characters is small. Hence, residual images can be removed by the refresh operation, and characters can be displayed clearly even when the font size is small.

Alternatively, the refresh operation may be executed if the font size is smaller than a predetermined size. In this modification, the refresh operation can be executed without calculating the timing value.

Next, operations executed by the image display device 101, when the second mode is selected, are described. Here, the same processes as those in the first mode will not be described, and only processes different from those in the first mode will be described.

In the second mode, the timing of execution of the refresh operation is controlled based on the number-of-times counter stored in the number-of-times counter storage area 932, in addition to display contents. Hence, in S1111 in the screen rewrite process shown in FIG. 15, the CPU 90 increments by one the value of the number-of-times counter stored in the number-of-times counter storage area 932, at the same time as the image forming operation is executed.

Further, the CPU 90 resets to zero the value of the number-of-times counter stored in the number-of-times counter storage area 932, in S44 in the memory card check process shown in FIG. 11, in S52 in the refresh operation check process shown in FIG. 12, in S65 in the charging state check process shown in FIG. 13, in S79 in the USB check process shown in FIG. 14, and in S1107 in the screen rewrite process shown in FIG. 15, at the same time as the refresh operation is executed. Hence, the number-of-times counter storage area 932 stores the number of times the image forming operations have been executed after the previous refresh operation is executed.

In S1101 in the screen rewrite process shown in FIG. 15, the CPU 90 acquires a number-of-times coefficient (Count) in addition to the font size coefficient and the threshold value. Further, in S1102 the CPU 90 acquires the value of the number-of-times counter (count) stored in the number-of-times counter storage area 932, in addition to the font size of display contents to be displayed (drawn).

Then, in S1105 the CPU 90 calculates the timing value based on equation (6) shown below, using the value of the number-of-times counter (count) stored in the number-of-times counter storage area 932 and the number-of-times coefficient (Count) acquired from the weighting table stored in the weighting table storage area 931, in addition to display contents.

$$\text{TimingVal}=1.0/(\text{Fontsize}*\text{fontsize})+(\text{Count}*\text{count}) \quad (6)$$

In this way, if the timing value is calculated in the second mode, adhesion of charged particles due to repetition of image forming operations can be suppressed.

Next, operations executed by the image display device 101, when the third mode is selected, are described. Here, the same processes as those in the second mode will not be described, and only processes different from those in the second mode will be described.

In the third mode, the timing of execution of the refresh operation is controlled based on the first elapsed time from the previous image forming operation until the current image forming request, in addition to display contents and the value of the number-of-times counter. Hence, in S1111 in the screen rewrite process shown in FIG. 15, the CPU 90 acquires the current time from the timer 94 and stores the time in the previous rewrite time storage area 1933, at the same time as the image forming operation is executed.

In S1101 the CPU 90 acquires a first elapsed time coefficient (TimeW) in addition to the font size coefficient, the threshold value, and the number-of-times coefficient. Further, in S1102 the CPU 90 acquires the time at which the previous image forming request was made (prev_write_time) stored in the previous rewrite time storage area 1933 and acquires the current time (current_time) from the timer 94, in addition to the font size and the value of the number-of-times counter.

Then, in S1105 the CPU 90 calculates the timing value based on equation (7) shown below, using the time at which the previous image forming request was made (prev_write_time) stored in the previous rewrite time storage area 1933, the current time (current_time), and the first elapsed time coefficient (TimeW) acquired from the weighting table stored in the weighting table storage area 931 (i.e., in consideration of the first elapsed time), as well as display contents and the value of the number-of-times counter.

$$\text{TimingVal}=1.0/(\text{Fontsize}*\text{fontsize})+\text{TimeW}*(\text{current\_time}-\text{prev\_write\_time})+(\text{Count}*\text{count}) \quad (7)$$

In this way, if the timing value is calculated in the third mode, adhesion of charged particles can be suppressed even when a voltage is not applied for a long time and gray degradation has occurred.

Next, operations executed by the image display device 101, when the fourth mode is selected, are described. Here, the same processes as those in the second mode will not be described, and only processes different from those in the second mode will be described.

In the fourth mode, the timing of execution of the refresh operation is controlled based on the second elapsed time from the previous refresh operation until the current image forming request, in addition to display contents and the value of the number-of-times counter. Thus, the CPU 90 acquires the current time from the timer 94 and stores the time in the previous refresh time storage area 1936 in S2 in the main process shown in FIG. 10, in S44 in the memory card check process shown in FIG. 11, in S52 in the refresh operation check process shown in FIG. 12, in S65 in the charging state check process shown in FIG. 13, in S79 in the USB check process shown in FIG. 14, and in S1107 in the screen rewrite process shown in FIG. 15, at the same time as the refresh operation is executed.

In S1101 in the screen rewrite process shown in FIG. 15, the CPU 90 acquires a second elapsed time coefficient (TimeRW) in addition to the font size coefficient, the threshold value, and the number-of-times coefficient. Further, in S1102 the CPU 90 acquires the time at which the previous refresh operation was executed (prev_refresh_time) stored in the previous refresh time storage area 1936, and acquires the current time from the timer 94, in addition to the font size and the value of the number-of-times counter.

Then, in S1105 the CPU 90 calculates the timing value based on equation (8) shown below, using the time at which the previous refresh operation was executed (prev_refresh_time) stored in the previous refresh time storage area 1936, the current_time (current_time), and the second elapsed time coefficient (TimeRW) acquired from the weighting table stored in the weighting table storage area 931 (i.e., in consideration of the second elapsed time), as well as display contents and the value of the number-of-times counter.

$$\text{TimingVal}=1.0/(\text{Fontsize}*\text{fontsize})+\text{Time}RW*\\(\text{current\_time}-\text{prev\_refresh\_time})+\\(\text{Count}*\text{count}) \quad (8)$$

In this way, if the timing value is calculated in the fourth mode, adhesion of charged particles due to repetition of image forming operations can be suppressed.

Next, operations executed by the image display device 101, when the fifth mode is selected, are described. Here, the same processes as those in the third mode will not be described, and only processes different from those in the third mode will be described.

In the fifth mode, the timing of execution of the refresh operation is controlled in consideration of temperature at the image forming request (temp) acquired from the temperature sensor 81, in addition to display contents and the first elapsed time (current_time−prev_write_time).

Hence, in S1101 in the screen rewrite process shown in FIG. 15, the CPU 90 acquires a temperature coefficient (Temp) from the weighting table storage area 931, in addition to the font size coefficient, the threshold value, the number-of-times coefficient, and the first elapsed time coefficient. Further, in S1102 the CPU 90 acquires the current temperature (temp) from the temperature sensor 81, in addition to the font size, the value of the number-of-times counter, the time at which the previous image forming request was made, and the current time.

Then, in S1105 the CPU 90 calculates the timing value based on equation (9) shown below.

$$\text{TimingVal}=1.0/(\text{Fontsize}*\text{fontsize})+\text{Time}W*\\(\text{current\_time}-\text{prev\_write\_time})+(\text{Count}*\text{count})+\\\text{Temp}*\text{temp} \quad (9)$$

In this way, if the timing value is calculated in the fifth mode, gray degradation at locations with high temperature can be coped with.

Figure 16:
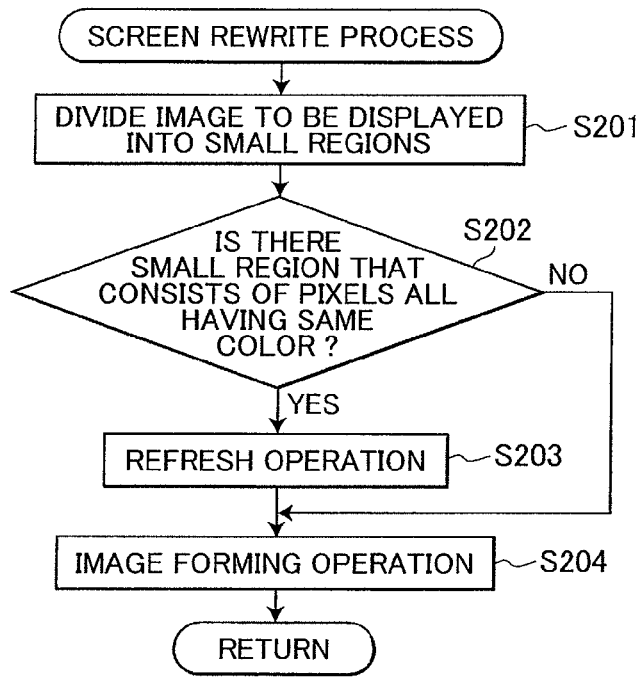
FIG. 16 is a flowchart of the screen rewrite process executed in a sixth mode.

In the above-described embodiment, the image display device 101 having five modes of the first through fifth modes has been described. In a modification described next, the image display device has also a sixth mode. The image display device of the modification has exterior appearance and electrical configuration which are identical to those of the above-described image display device 101 having five modes, and hence descriptions of the exterior appearance and electrical configuration are omitted. Further, since the operations in the five modes except the sixth mode are the same as the operations described above, descriptions of the operations in the five modes are omitted. Hereinafter, the screen rewrite process executed when the sixth mode is selected is described while referring to FIG. 16. FIG. 16 is a flowchart of the screen rewrite process executed in the sixth mode.

As shown in FIG. 16, first, the CPU 90 divides an image to be displayed on the display panel 2 into a plurality of small regions, each having a predetermined area (for example, 3 centimeters by 3 centimeters, 30 pixels by 30 pixels, or the like) (S201). Here, the area of each small region may be set appropriately by the user, or may be predetermined for each image display device.

Next, the CPU 90 determines whether there is at least one small region that consists of pixels all having the same color, among all of the divided small regions (S202).

If there is a small region that consists of pixels all having the same color among the divided small regions (S202:YES), the CPU 90 executes the refresh operation which is the same as in the other modes (S203) and then executes the image forming operation which is the same as in the other modes (S204). Then, the screen rewrite process ends.

If there is no small region that consists of pixels all having the same color among the divided small regions (S202: NO), the CPU 90 skips S203 and executes the image forming operation which is the same as in the other modes (S204). Then, the screen rewrite process ends.

In this way, according to the sixth mode, the refresh operation can be executed if an image to be displayed includes a region of a predetermined area that is displayed by pixels having the same color. Accordingly, the image display device 101 can solve a problem that a residual image appears when a so-called solid image is displayed.

As described above, according to the image display device 101 of the present embodiment, whether or not the refresh operation is executed is determined based on display contents of an image that is displayed upon an image forming request. When image forming operations are executed in a repeated manner, display contents of previous several image forming operations sometimes remain as a residual image. Depending on display contents that will be displayed, the display contents may become hard to read or may be displayed unclearly. Accordingly, the refresh operation can be executed to display clear images when such a residual image of the previous image considerably affects display quality, for example, in cases where the image includes a large number of small characters, characters having thin lines, characters having complicated shapes, or a large number of pixels having the same color, and the like.

Further, the timing of the refresh operation can be determined in consideration of the number of times of image forming operations, the elapsed times, and the temperature, in addition to the display contents. Hence, adhesion of particles due to repetition of image forming operations can be prevented, and also recovery of gray degradation due to elapsed time can be performed. Further, execution of the refresh operation is determined at timing when a certain operation is performed by the user. More specifically, the refresh operation is performed to improve the display quality, upon detecting the user's operation from which it can be expected that the user will start using the display. Further, the refresh operation consuming a relatively long time can be performed by utilizing a time period when the user does not see the display panel, thereby improving user's convenience.

Note that, in the above-described embodiment, the CPU 90 that executes the image forming operation in S1111 of FIG. 15 and in S204 of FIG. 16 functions as the image forming section. Further, the CPU 90 that executes the refresh operation in S1107 of FIG. 15 and in S203 of FIG. 16 functions as the refresh controlling section. Further, the CPU 90 that determines whether the timing value exceeds the threshold value in S1106 of FIG. 15 functions as the refresh determining section. The CPU 90 that determines whether there is a small region consisting of pixels all having the same color in S202 of FIG. 16 also functions as the refresh determining section.

Although not mentioned in the above description, after the refresh operation is completed in S44 of FIG. 11, in S52 of FIG. 12, and in S107 of FIG. 8 in the first embodiment (S82 of FIG. 7), the CPU 90 again displays on the display panel 2 an image that was displayed before the refresh operation. Also, after the refresh operation is completed in S2' of FIG. 10, the CPU 90 displays a menu screen.

Next, an electrophoretic display device according to a third embodiment of the invention will be described while referring to FIGS. 17 through 23, wherein like parts and components are designated by the same reference numerals to avoid duplicating description. The electrophoretic display device of the third embodiment is applied to an image display device 201.

Figure 17:
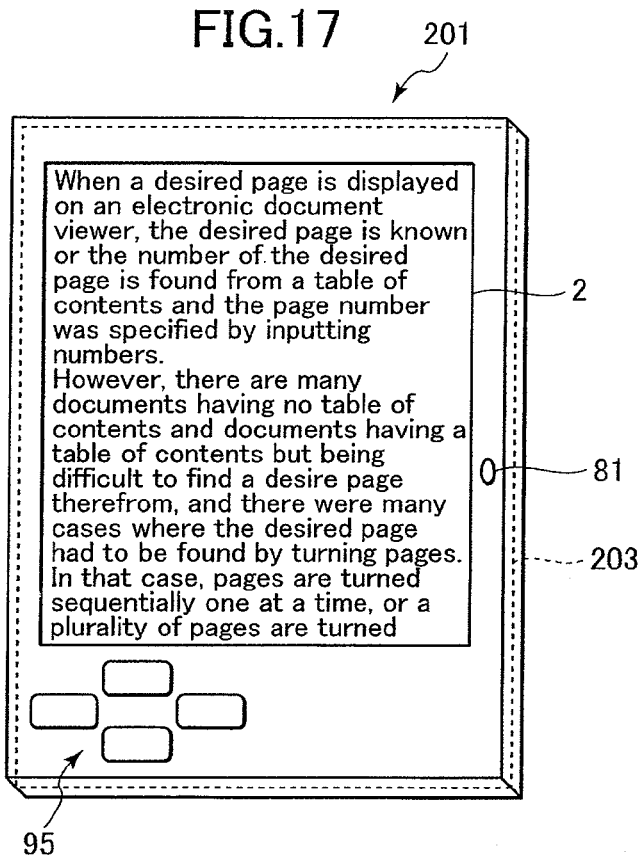
FIG. 17 is a perspective view of an image display device according to a third embodiment.

FIG. 17 is a perspective view of the image display device 201. As shown by the dotted lines in FIG. 17, a control board 203 is provided at the back side of the display panel 2 when the image display device 201 is viewed from the front side. The display panel 2 and the control board 203 are electrically connected to each other. As shown in FIG. 17, the temperature sensor 81 is disposed on the same surface on which the display panel 2 is provided. Thus, the temperature of the display panel 2 can be detected accurately. This arrangement is advantageous because, under situations where the temperatures are affected by outdoor sunlight or indoor lighting, the temperatures are likely to differ if the temperature sensor 81 and the display panel 2 are provided on different surfaces.

Figure 18:
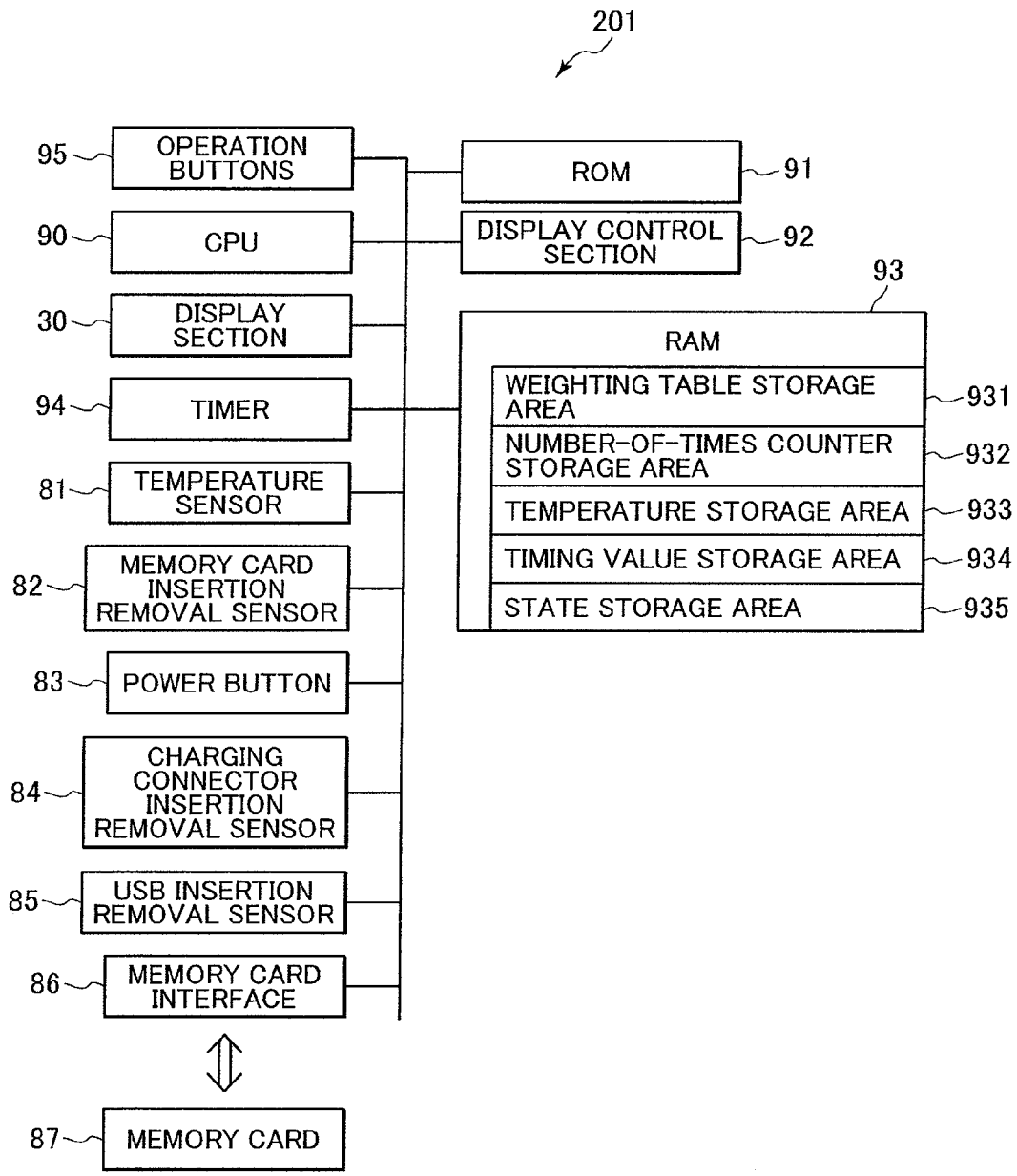
FIG. 18 is a block diagram showing the electrical configuration of the image display device according to the third embodiment.

Next, the electrical configuration of the image display device 201 will be described. FIG. 18 is a block diagram showing the electrical configuration of the image display device 201. As shown in FIG. 18, the RAM 93 includes the weighting table storage area 931, the number-of-times counter storage area 932, the temperature storage area 933, the timing value storage area 934, the state storage area 935, and other storage areas (not shown). The weighting table storage area 931 stores a weighting table for determining timing at which a refresh operation is executed in a screen rewrite process to be described later. The number-of-times counter storage area 932 stores a counter for counting the number of times the image forming operations are executed on the display section 30 since the previous refresh operation was executed. The temperature storage area 933 stores ambient temperature detected by the temperature sensor 81. The timing value storage area 934 stores a timing value for determining timing at which a refresh operation is executed, the timing value being calculated based on the number of times the image forming operations are executed and on the detected temperature. The state storage area 935 stores a current state of the image display device 201, such as whether a memory card is inserted, whether charging is performed, and whether USB is connected.

Figure 19:
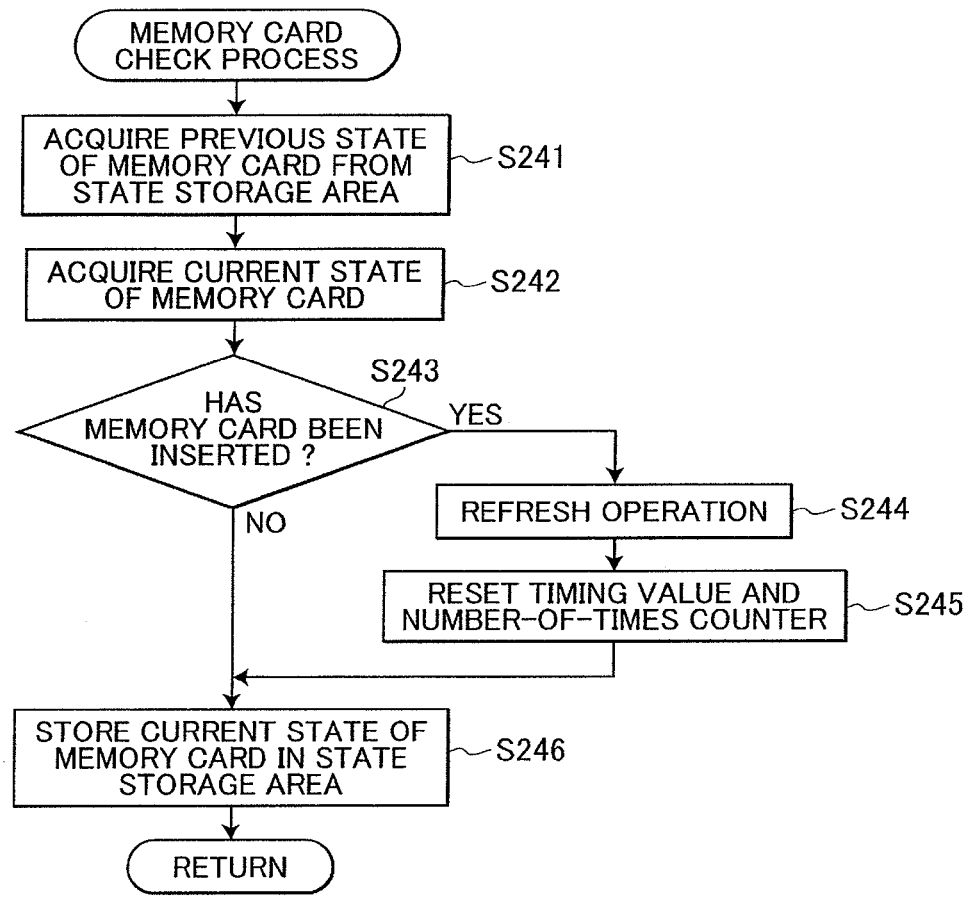
FIG. 19 is a flowchart of a memory card check process executed in a main process according to the third embodiment.
Figure 20:
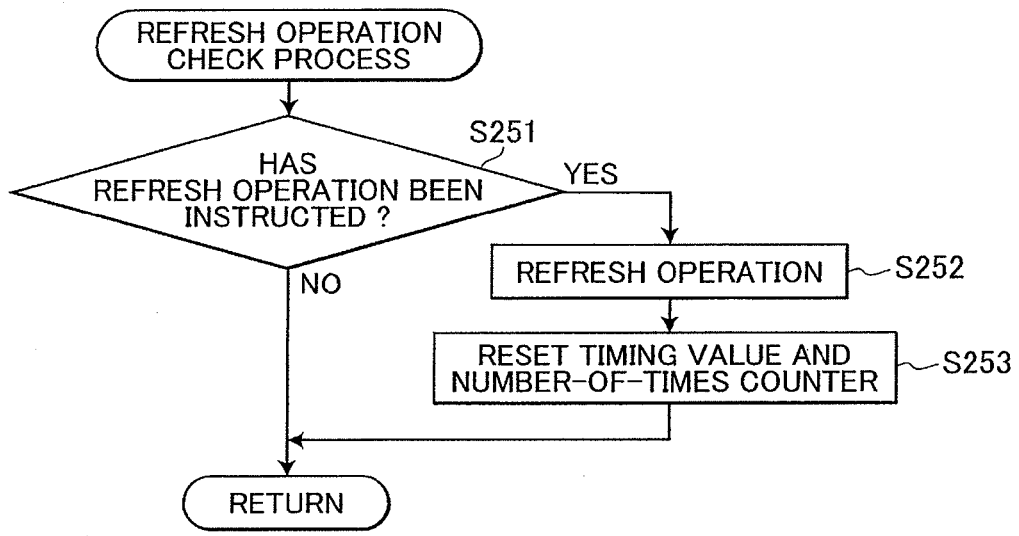
FIG. 20 is a flowchart of a refresh button check process executed in the main process.
Figure 21:
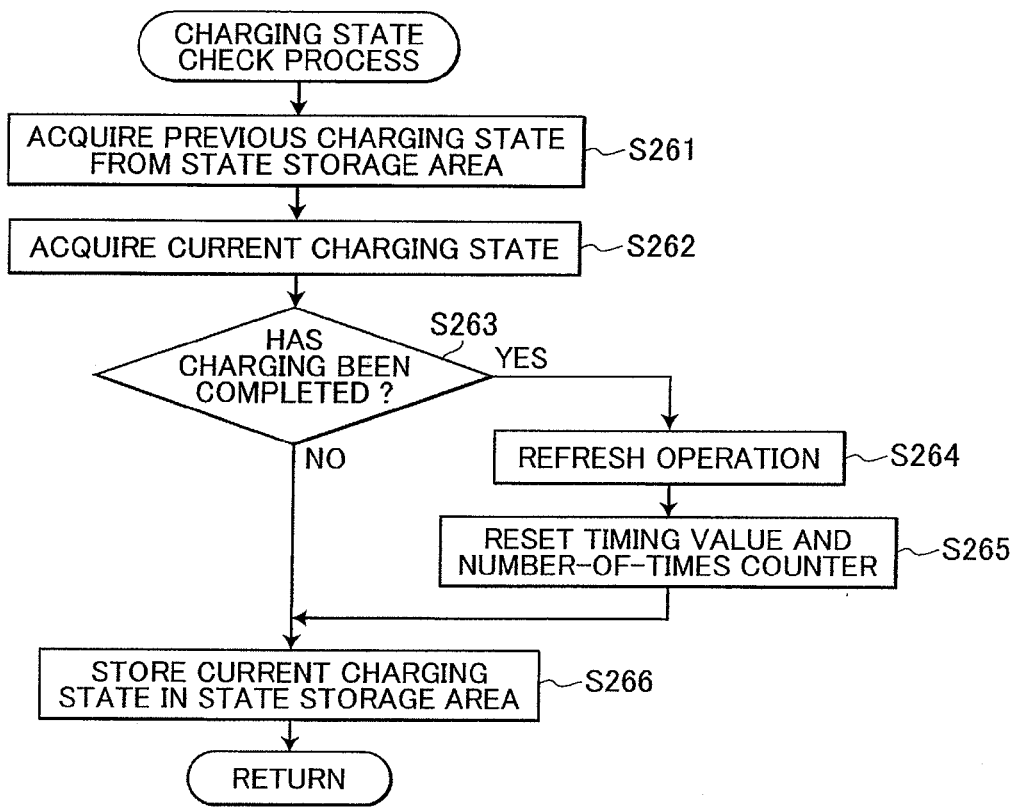
FIG. 21 is a flowchart of a charging state check process executed in the main process.
Figure 22:
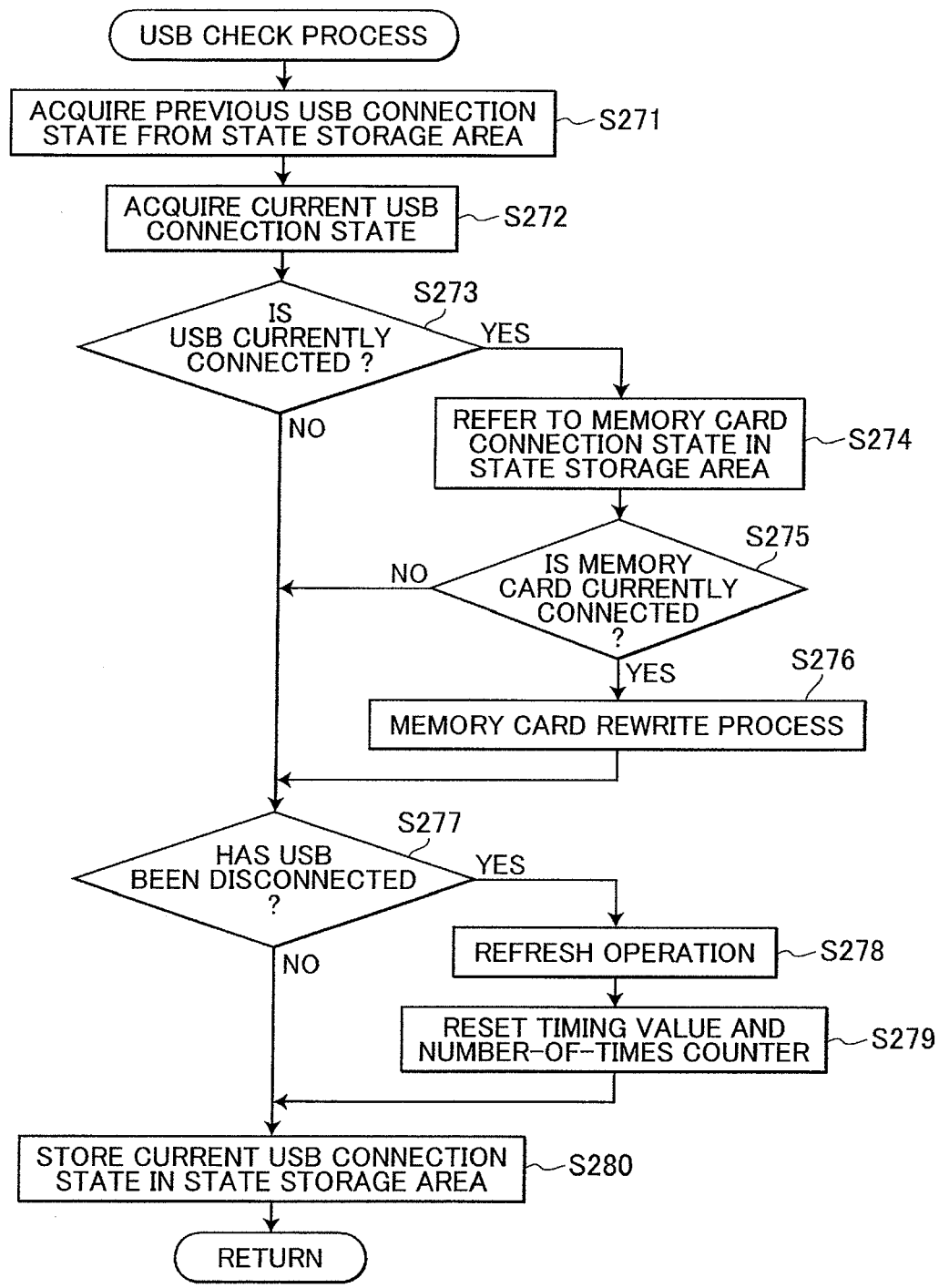
FIG. 22 is a flowchart of a USB check process executed in the main process.
Figure 23:
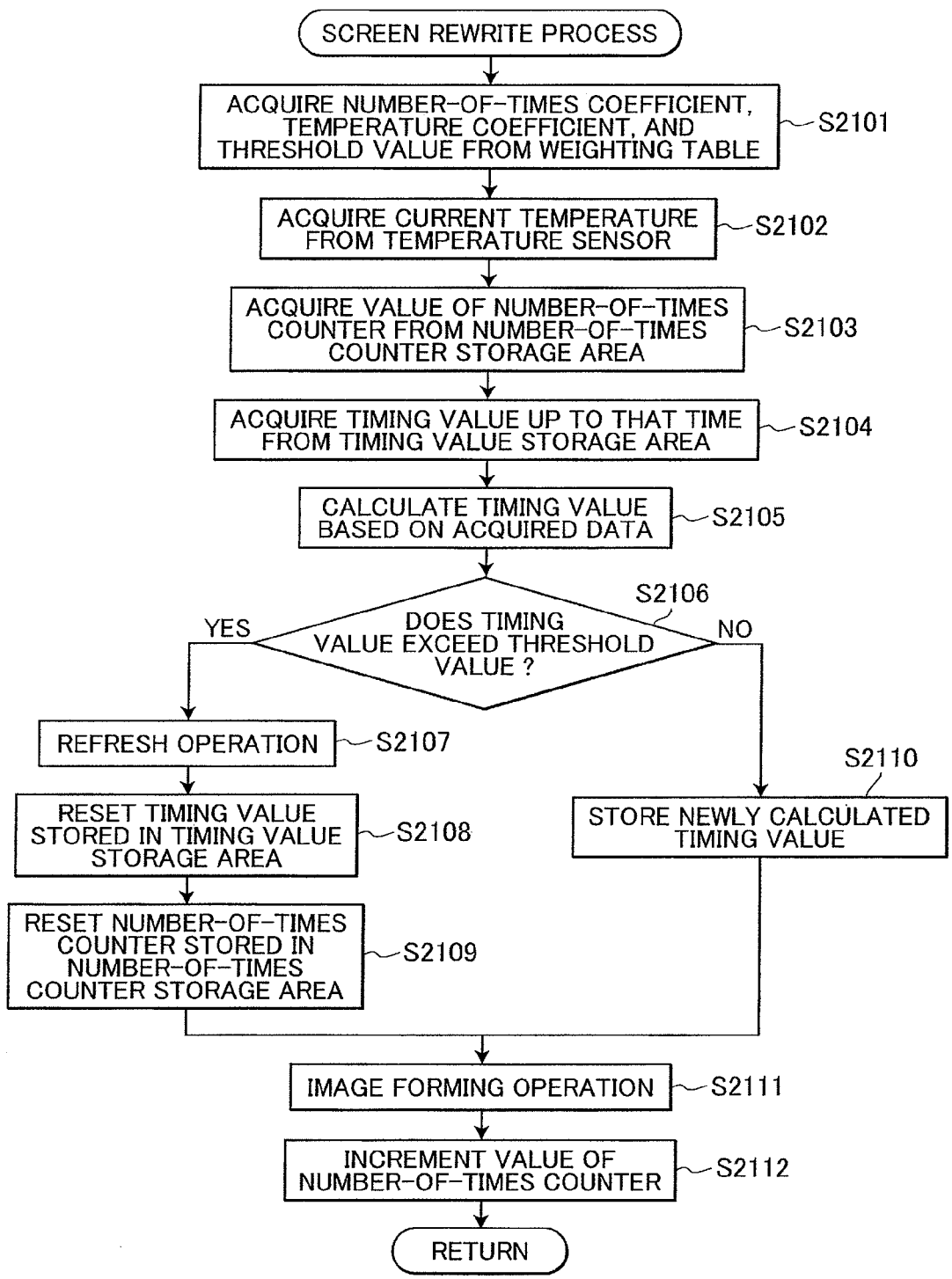
FIG. 23 is a flowchart of a screen rewrite process executed in the image forming request check process.

Next, with the above-described configuration, operations executed by the image display device 201 will be described while referring to FIGS. 19 through 23. FIG. 19 is a flowchart of a memory card check process executed in a main process. FIG. 20 is a flowchart of a refresh button check process executed in the main process. FIG. 21 is a flowchart of a charging state check process executed in the main process. FIG. 22 is a flowchart of a USB check process executed in the main process. FIG. 23 is a flowchart of a screen rewrite process executed in an image forming request check process.

As shown in FIG. 10 in the second embodiment, when the power button 83 is pushed to turn the power on, the main process begins. First, the CPU 90 executes an initialization process for initializing (resetting) the state storage area 935 and the like (S1'). Next, the CPU 90 executes a refresh operation (S2'). The CPU 90 reads out refresh data stored in a refresh data memory (not shown) in the RAM 93, and executes the refresh operation based on a refresh operation control signal. More specifically, the refresh operation control signal is transmitted via a driver (not shown), and a voltage is applied between the lower electrode 12 and the upper electrode 22 so that a predetermined electric field is generated. Consequently, the charged particles 33a and 33b in the display section 30 are uniformly dispersed.

Next, the CPU 90 resets the timing value stored in the timing value storage area 934 and the value of the number-of-times counter stored in the number-of-times counter storage area 932 (S3'). Next, the CPU 90 executes a memory card check process for determining whether the memory card 87 is inserted into or removed from the memory card slot (not shown) of the image display device 201 (S4'). The memory card check process will be described in greater detail while referring to FIG. 19.

Next, the CPU 90 executes a refresh operation check process for checking whether the refresh operation is instructed via the operation buttons 95 (S5'). The refresh operation check process will be described in greater detail while referring to FIG. 20.

Next, the CPU 90 executes a charging state check process for checking whether charging is started or completed (S6'). The charging state check process will be described in greater detail while referring to FIG. 21.

Next, the CPU 90 executes a USB connection state check process for checking whether the image display device 201 is connected to a PC via USB (S7'). The USB connection state check process will be described in greater detail while referring to FIG. 22.

Next, the CPU 90 executes an image forming request check process for checking whether an image forming request is made and for executing an image forming operation when the image forming request is made (S8'). The image forming request check process will be described in greater detail while referring to FIG. 7 in the first embodiment and FIG. 23.

Next, the CPU 90 determines whether the power button 83 has been pushed (S9'). If the power button has been pushed (S9': YES), the CPU 90 executes the refresh operation (S10'), resets the timing value and the number-of-times counter (S1'), and ends the process. The power is then turned off. If the power button has not been pushed (S9': NO), the CPU 90 returns to S4' to repeat the process. Note that, after the refresh operation in S10', the CPU 90 displays an image that was displayed prior to the refresh operation.

Next, the memory card check process executed in the main process will be described while referring to FIG. 19. First, the CPU 90 acquires a previous state of the memory card 87 (i.e., whether the memory card was inserted in the memory card slot) from the state storage area 935 (S241). Next, the CPU 90 acquires a current state of the memory card 87 from the memory card insertion removal sensor 82 (S242).

Next, the CPU 90 compares the previous state acquired in S241 and the current state acquired in S242, and determines whether the memory card 87 has been inserted (S243). The CPU 90 determines that the memory card 87 has been inserted, only if the previous state indicates that the memory card 87 is not inserted in the slot and the current state indicates that the memory card 87 is inserted in the slot (S243: YES). In this case, since it is expected that the image forming operation will be requested soon, the CPU 90 executes the refresh operation in order to display clear images (S244). In contrast, the CPU 90 does not determine that the memory card 87 has just been inserted in the following three cases: where the memory card 87 is previously inserted and the memory card 87 is currently inserted; the memory card 87 is previously inserted and the memory card 87 is not currently inserted; and the memory card 87 is not previously inserted and the memory card 87 is not currently inserted (S243: NO). In all of these cases, the process moves to S246 described later. The CPU 90 stores the current state acquired in S242 in the state storage area 935 (S246) and returns to the main process.

After the CPU 90 executes the refresh operation in S244, the CPU 90 resets the timing value stored in the timing value storage area 934 and the value of the number-of-times counter stored in the number-of-times counter storage area 932 (S245). Then, the CPU 90 proceeds to S246. Note that, after the refresh operation in S244, the CPU 90 displays an image that was displayed prior to the refresh operation.

In S243 and S244 described above, the refresh operation is executed only if the CPU 90 determines that the memory card 87 is not previously inserted and is currently inserted. This is because it is expected that the image forming operation will be requested soon, based on contents data stored in the memory card 87.

Next, the refresh operation check process executed in the main process will be described while referring to FIG. 20. First, the CPU 90 determines whether the refresh operation has been instructed via the operation buttons 95 (S251). If the refresh operation has been instructed via the operation buttons 95 (S251: YES), the CPU 90 executes the refresh operation in accordance with the user's request (S252), resets the timing value stored in the timing value storage area 934 and the value of the number-of-times counter stored in the number-of-times counter storage area 932 (S253), and returns to the main process. If the refresh operation has not been instructed (S251: NO), the CPU 90 directly returns to the main process Note that, after the refresh operation in S252, the CPU 90 displays an image that was displayed prior to the refresh operation.

Next, the charging state check process executed in the main process will be described while referring to FIG. 21. First, the CPU 90 acquires a previous charging state (i.e., whether charging is performed) from the state storage area 935 (S261). Next, the CPU 90 acquires a current charging state from the charging connector insertion removal sensor 84 (S262).

Next, the CPU 90 compares the previous charging state acquired in S261 and the current charging state acquired in S262, and determines whether charging has ended based on whether the charging state has changed from a state where a charging connector is inserted to a state where the charging connector is removed (S263). If charging has ended (S263: YES), the CPU 90 executes the refresh operation (S264) since it is expected that the image forming operation will be requested soon. Then, the CPU 90 resets the timing value stored in the timing value storage area 934 and the value of the number-of-times counter stored in the number-of-times counter storage area 932 (S265). Then, the CPU 90 proceeds to S266. Note that, after the refresh operation in S264, the CPU 90 displays an image that was displayed prior to the refresh operation.

If charging has not ended (S263: NO), the CPU 90 stores the current charging state acquired in S262 into the state storage area 935 (S266) and returns to the main process.

Next, the USB check process executed in the main process will be described while referring to FIG. 22. First, the CPU 90 acquires a previous connection state of USB (i.e., whether USB is connected) from the state storage area 935 (S271). Next, the CPU 90 acquires a current connection state of USB from the USB insertion removal sensor 85 (S272).

Next, the CPU 90 determines whether the current connection state is a connected state (S273). If the USB is in a connected state (S273: YES), the CPU 90 refers to the state storage area 935 (S274) and determines whether the memory card 87 is currently in an inserted state (S275).

If the memory card is currently in an inserted state (S275: YES), the CPU 90 starts a memory card rewrite process for writing contents data in a PC into the memory card 87 and for erasing contents data in the memory card 87 via the USB and the memory card interface 86, in accordance with an instruction from a PC (S276).

The memory card rewrite process (S276) is not described in detail since the process is not directly related to the invention. In the memory card rewrite process, the contents stored in the memory card 87 can be rewritten in accordance with an instruction from the PC as described above. When the memory card rewrite process (S276) ends, the CPU 90 proceeds to S277 described later. Note that in S276, contents stored in the memory card 87 can be rewritten freely.

If the CPU 90 determines that the USB is not in a connected state (S273: NO), the CPU 90 directly proceeds to S277 described later. Also, if the CPU 90 determines that the memory card is not currently in an inserted state (S275: NO), the CPU 90 moves to S277 described later.

Next, the CPU 90 compares the previous connection state acquired in S271 and the current connection state acquired in S272, and determines whether the USB has been disconnected (connection with the PC has been disconnected) based on whether the connection state has changed from a state where the USB is connected to a state where the USB is not connected (S277). If the USB has been disconnected (S277: YES), the CPU 90 executes the refresh operation (S278) since it is expected that the image forming operation will be requested. Then, the CPU 90 resets the timing value stored in the timing value storage area 934 and the value of the number-of-times counter stored in the number-of-times counter storage area 932 (S279). Then, the CPU 90 proceeds to S280. Note that, after the refresh operation in S278, the CPU 90 displays an image that was displayed prior to the refresh operation.

If the USB has not been disconnected (S277: NO), the CPU 90 stores the current connection state acquired in S272 in the state storage area 935 (S280) and returns to the main process.

As describe above, the refresh operation is executed (S278) if a determination is made that the USB has been disconnected (S277: YES). This is because, when the USB has been disconnected, it is expected that the image forming operation will be requested soon. More specifically, the user does not execute the screen rewrite operation very often when the USB is connected and the memory card rewrite process is being executed, whereas the user often executes the screen rewrite operation when the USB is disconnected and the image display device 201 is carried for use.

Next, the image forming request check process executed in the main process will be described while referring to FIG. 7 in the first embodiment and FIG. 23. First, the CPU 90 determines whether the screen rewrite operation has been instructed via the operation buttons 95 (S81 in FIG. 7). If the screen rewrite operation has been instructed (S81: YES), the CPU 90 executes the screen rewrite process (S82, FIG. 23) and returns to the main process. If the screen rewrite operation has not been instructed (S81: NO), the CPU 90 directly returns to the main process.

In the screen rewrite process, as shown in FIG. 23, first the CPU 90 acquires a number-of-times coefficient (Count), a temperature coefficient (Temp), and a threshold value of the timing value (Thre) from a weighting table stored in the weighting table storage area 931 (S2101). Next, the CPU 90 acquires the current temperature (current_temp) from the temperature sensor 81 and stores the acquired temperature in the temperature storage area 933 (S2102).

Next, the CPU 90 acquires the value of the number-of-times counter (count) stored in the number-of-times counter storage area 932 (S2103). Next, the CPU 90 acquires the timing value up to that time (Prev_TimingVal) stored in the timing value storage area 934 (S2104).

Next, the CPU 90 calculates the timing value (TimingVal) using both the coefficients acquired in S2101 and the values acquired in S2102 through S2104 (S2105). Here, the timing value is calculated based on equation (10) shown below.

$$\text{TimingVal}=\text{Prev\_TimingVal}+\{\text{Temp}*\text{current\_temp}\}/\{\text{Count}*\text{count}+1\} \quad (10)$$

This equation shows that the timing value (TimingVal) is a value obtained by accumulating the timing value up to that time (Prev_TimingVal).

The CPU 90 then determines whether the timing value calculated in S2105 exceeds the threshold value acquired in S2101 (i.e., whether an inequality TimingVal>Thre is satisfied) (S2106). If the timing value exceeds the threshold value (S2106: YES), the CPU 90 executes the refresh operation (S2107), by determining that it is now the timing when the refresh operation should be performed based on the number of times of the image forming operations since the previous refresh operation and on the current temperature. Then, the CPU 90 resets to zero the timing value stored in the timing value storage area 934 (S2108). Further, the CPU 90 resets to zero the value of the number-of-times counter stored in the number-of-times counter storage area 932 (S2109). Note that, after the refresh operation in S2107, the CPU 90 displays an image that was displayed prior to the refresh operation.

Next, the CPU 90 executes the image forming operation on the display section 30 in accordance with the request (S2111). Here, in the image forming operation, an image is written in accordance with the above-described screen rewrite operation (FIG. 7 in the first embodiment, S81). For example, if the screen rewrite operation instructed in S81 is a page turning operation for turning pages that are displayed, an image is written based on image data of the next page stored in the memory card 87. If the screen rewrite operation instructed in S81 is a content switching operation for switching contents that are displayed, an image is written based on image data of different contents.

In this way, the image forming operation has been executed one time after execution of the refresh operation (S2107). Thus, the CPU 90 updates the value of the number-of-times counter stored in the number-of-times counter storage area 932 to a value incremented by one (S2112). Then, the CPU 90 returns to the image forming request check process.

If the timing value does not exceed the threshold value (S2106: NO), the CPU 90 stores the timing value calculated in S2105 into the timing value storage area 934 (S2110), and executes the image forming operation on the display section 30 in accordance with the image forming request (S2111). Then, since the image forming operation has been executed, the CPU 90 updates the value of the number-of-times counter stored in the number-of-times counter storage area 932 to a value incremented by one (S2112). Then, the CPU 90 returns to the image forming request check process.

Note that, according to the above-described method for calculating the timing value in S2105, the refresh operation is more likely to be executed when the temperature is high on average at the time of each image forming request. Accordingly, accumulation of gray degradation due to high temperature that continues for a long time can be coped with.

Alternatively, all temperatures detected at a predetermined time interval since the previous refresh operation may be stored in the temperature storage area 933, and the timing value may be calculated using the maximum value of the temperatures (max_temp) based on equation (11) shown below.

$$\text{TimingVal}=\{\text{Temp}*\text{max\_temp}\}+\{\text{Count}*\text{count}\} \quad (11)$$

If the timing value is calculated in this way, the refresh operation is more likely to be executed when a high temperature is detected during a period from the previous refresh operation until the image forming request. Accordingly, gray degradation due to a temporary and rapid increase in temperature during a period from the previous refresh operation until the image forming request can be coped with.

Alternatively, all temperatures detected at a predetermined time interval since the previous refresh operation may be stored in the temperature storage area 933, and the timing value may be calculated using the sum of the temperatures (sum_temp) based on equation (12) shown below.

$$\text{TimingVal}=\{\text{Temp}*\text{sum\_temp}\}/\{\text{Count}*(\text{count}+1)\} \quad (12)$$

If the timing value is calculated in this way, the refresh operation is more likely to be executed when the temperature is high on average at the time of each image forming request during a period from the previous refresh operation until the current image forming request. Accordingly, accumulation of gray degradation due to high temperature that continues for a long time can be coped with.

Still alternatively, the timing value may be calculated using the value of the temperature sensor at the time when the image forming request is made, based on equation (13) shown below.

$$\text{TimingVal}=\{\text{Temp}*\text{current\_temp}\}+\{\text{Count}*\text{count}\} \quad (13)$$

If the timing value is calculated in this way, the refresh operation is more likely to be executed when the image forming request is made in high temperature. Accordingly, the refresh operation can be executed frequently when the image display device is used at a location with high temperature.

As described above, according to the image display device of the present embodiment, the timing of the refresh operation is determined in consideration of temperature information in addition to the number of times of image forming operations since the previous refresh operation. Accordingly, if gray degradation has occurred at a location with high temperature, the refresh operation is executed even when the number of times of image forming operations up to that time is few. Further, the timing of the refresh operation is determined in accordance with a certain operation performed by a user. For example, if an operation from which it is expected that the user will use the display is detected, a writing operation can be expected after the operation. Hence, the refresh operation can be executed even when gray degradation cannot be detected only from the number of times of image forming operations and the temperature.

Note that, in the above-described embodiment, the CPU 90 that executes the image forming operation in S2111 of FIG. 23 functions as the image forming section. Further, the CPU 90 that executes the refresh operation in S2107 of FIG. 23 functions as the refresh controlling section. Further, the CPU 90 that increments the value of the number-of-times counter in S2112 of FIG. 23 functions as the image formation times counting section. Further, the CPU 90 that determines whether the timing value exceeds the threshold value in S2106 of FIG. 23 functions as the refresh determining section.

While the invention has been described in detail with reference to the above aspects thereof, it would be apparent to those skilled in the art that various changes and modifications may be made therein without departing from the scope of the claims.

In one example in the first embodiment, the timing value is calculated in consideration of all of the first elapsed time since the previous image forming operation, the second elapsed time since the previous refresh operation, the number of times of execution of the image forming operations since the previous refresh operation, and the temperature of the display panel 2, and the refresh operation is executed when the timing value exceeds the predetermined threshold value. However, the timing values may be calculated respectively for each of the first elapsed time, the second elapsed time, the number of times of execution of the image forming operations, and the temperature of the display panel. And execution of the refresh operation may be determined based on threshold values provided respectively for each of the timing value.

In the second embodiment, the image display device 101 has five or six modes. However, it may be configured such that the image display device can be operated only in one mode among the above-described modes, and that the mode cannot be changed.

In the second embodiment, whether or not the refresh operation is executed is determined based on the size of characters. However, if there is a plurality of sizes of characters in a displayed image, whether or not the refresh operation is executed may be determined based on the smallest size of characters.

In the sixth mode in the second embodiment, in S202 shown in FIG. 16, a determination is made whether there is at least one small region that consists of pixels all having the same color among all of the divided small regions. However, the refresh operation may be executed when the colors of adjacent pixels are different to each other in the up-down and left-right directions (for example, a checkered pattern). In this modification, the refresh operation can be executed when a gray area is larger than or equal to a predetermined area. This is especially effective in an image display device that displays images in two colors of black and white.

In the image display device 101 in the second embodiment, the execution of the refresh operation is determined based on information on the font size (FIG. 15, S1102). In the sixth mode, the execution of the refresh operation is determined when there is at least one small region that consists of pixels all having the same color among all of the divided small regions (FIG. 16, S202). However, the execution of the refresh operation may be determined based on another method relating to display contents. For example, the font size may be determined based on the number of characters arranged in one direction of the display panel 2, if image data do not include information on the font size.

In the second embodiment, display contents may be determined based on how much ratio of pixels with the same color is arranged adjacently. For example, the refresh operation may be executed when pixels with the same color are arranged adjacently at a ratio larger than or equal to 10 percent of all the pixels on the display panel 2. Also, the refresh operation may be executed when regions having approximately the same ratio of a color included in a predetermined number of adjacent pixels (for example, five pixels by five pixels in height and width) are arranged adjacently at a ratio larger than or equal to 10 percent of all the pixels.

In the second embodiment, for example, in the second mode, the timing value is calculated based on the display contents and on the value of the number-of-times counter stored in the number-of-times counter storage area 932 to control the timing of execution of the refresh operation. However, timing values may be calculated separately for each of the display contents and the value of the number-of-times counter, and the execution of the refresh operation may be determined based on threshold values that are provided separately for each of the timing values.

In the third embodiment, when the image forming request is made in S81 (S81: YES), the temperature is acquired from the temperature sensor 81 in S2102 (FIG. 23). However, the image display device may be configured such that the temperature sensor 81 detects temperatures at a predetermined time interval (for example, once in five seconds), that the temperature stored in the temperature storage area 933 is updated at a predetermined time interval (for example, once in five seconds), and that in S2102 the timing value is calculated using the temperature stored in the temperature storage area 933 at that time as the current temperature.

In the third embodiment, the timing value is calculated based on the value of the number-of-times counter and on the temperature detected by the temperature sensor 81, and whether or not the refresh operation is executed is determined based on whether the timing value exceeds the predetermined threshold value. However, whether or not the refresh operation is executed may be determined directly from the value of the number-of-times counter and from the temperature detected by the temperature sensor 81, without calculating the timing value. For example, the execution of the refresh operation may be determined on condition that the value of the number-of-times counter reaches a predetermined number and that an average of temperatures detected by the temperature sensor 81 reaches a predetermined temperature.

Figure 24:
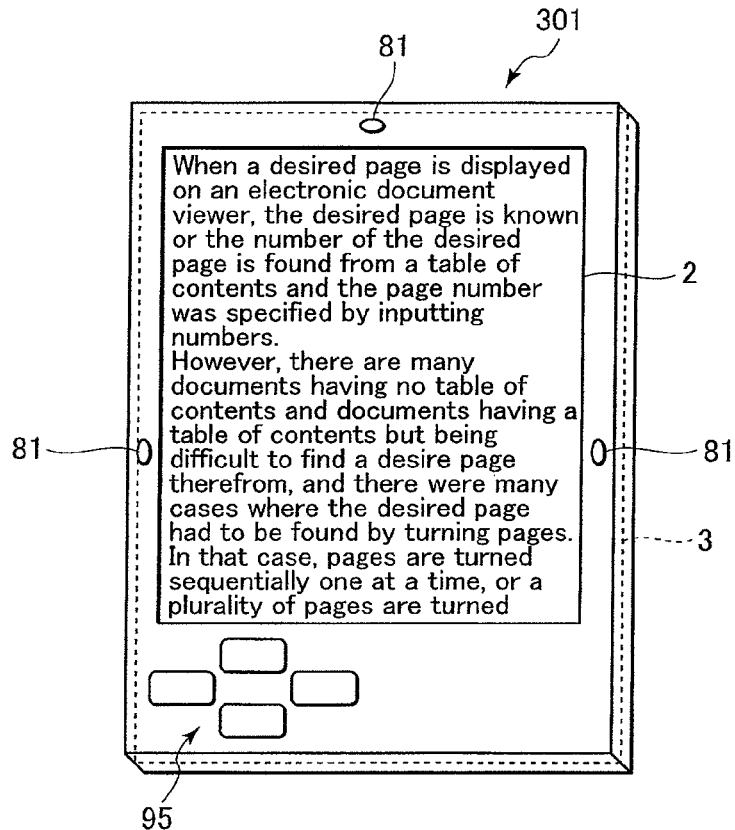
FIG. 24 is a perspective view of an image display device having a plurality of temperature sensors according to a modification.

In the third embodiment, a single temperature sensor 81 is provided in the image display device 201 (see FIG. 17). As shown in FIG. 24, however, a plurality of temperature sensors 81 may be provided, and whether or not the refresh operation is executed may be determined based on the highest temperature in a plurality of temperatures detected by the plurality of temperature sensors 81. FIG. 24 is a perspective view of an image display device 301 having the plurality of temperature sensors 81. In this way, since the image display device 301 determines the timing of the refresh operation based on the highest temperature in a plurality of temperatures detected by the plurality of temperature sensors 81, gray degradation can be coped with at a part of the display panel 2 where the temperature is high and thus gray degradation tends to occur.

Figure 25:
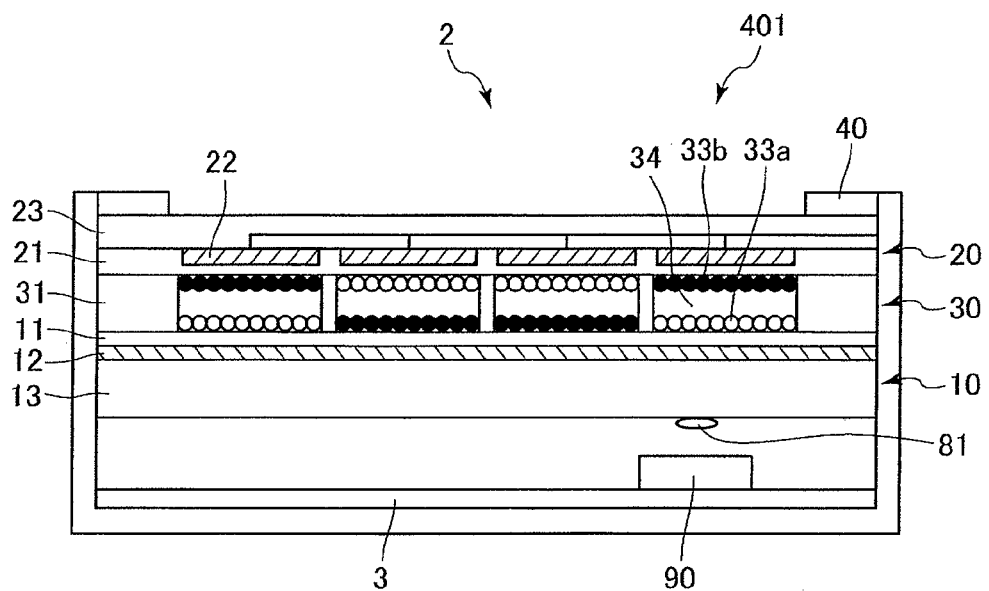
FIG. 25 is a cross-sectional view of an image display device according to another modification.

In the third embodiment, the temperature sensor 81 of the image display device 201 is disposed on a surface on which the display surface of the display panel 2 is disposed. As shown in FIG. 25, however, the temperature sensor 81 may be provided directly on the lower substrate 10 of the display panel 2 for detecting the temperature of the display panel 2.

Here, FIG. 25 is a cross-sectional view of an image display device 401. As shown in FIG. 25, the temperature sensor 81 is disposed at the intersection of the display panel 2 with an imaginary line passing the CPU 90 and extending perpendicular to the display panel 2. Hence, the temperature at a position that is most likely to receive heat from the CPU 90 can be detected. Accordingly, gray degradation can be coped with at a part of the display panel 2 where gray degradation is likely to occur due to heat received from the CPU 90. Although in FIG. 25 the CPU 90 is described as an example of a heat generating element, the same goes for another heat generating element (heat generating section) that is provided on the control unit (control board) 3 and that generates heat.

Further, the temperature sensor 81 may be provided at a position away from the operation buttons 95. With this arrangement, the temperature of the display panel 2 can be detected without being affected by the user's body temperature.

In the first through third embodiments described above, the time period t1/5 for the refresh operation is set to a time period shorter than the time period t2. However, the time period t1/5 may be set to a time period longer than the time period t2. In this case, a potential difference applied during the refresh operation should be set to a value smaller than V1-V2. Then, even if the refresh operation is executed when gray degradation has occurred, the charged particles 33 do not adhere to the substrates.

What is claimed is:

1. An electrophoretic display device comprising:
a first substrate having a first electrode;
a second substrate having a second electrode and arranged in confrontation with the first substrate, the first substrate and the second substrate forming a space therebetween, the first electrode and the second electrode being configured to generate an electric field having a direction, the direction being changeable depending on an electric voltage applied between the first electrode and the second electrode;
a display section provided in the space;
a dispersion medium filled in the display section and dispersed with a plurality of electrically-charged particles that migrates in accordance with the direction of the electric field;
an image forming section that, upon receiving an image forming request, applies the electric voltage between the first electrode and the second electrode to generate the electric field in the dispersion medium, thereby performing an image forming operation;
a refresh controlling section that, before the image forming section performs the image forming operation, switches the direction of the electric field alternately at predetermined timing to uniformly disperse the plurality of electrically-charged particles in the dispersion medium, thereby performing a refresh operation;
an image-formation-elapsed-time measuring section that measures a first elapsed time from a previous image forming operation performed by the image forming section until the image forming request;
a refresh determining section that determines whether the refresh controlling section performs the refresh operation based on the first elapsed time; and
a refresh-elapsed-time measuring section that measures a second elapsed time from a previous refresh operation performed by the refresh controlling section until the image forming request,
wherein the refresh determining section determines whether the refresh controlling section performs the refresh operation based on both the first elapsed time and the second elapsed time.

2. The electrophoretic display device according to claim 1, wherein the refresh determining section determines that the refresh controlling section performs the refresh operation if a value calculated based on the first elapsed time exceeds a predetermined threshold.

3. The electrophoretic display device according to claim 2, wherein the refresh determining section determines that the refresh controlling section performs the refresh operation if a value calculated based on a value obtained by multiplying the first elapsed time by a predetermined weight exceeds a predetermined threshold.

4. The electrophoretic display device according to claim 1, further comprising an image-formation-times counting section that counts a number of image formation times at which the image forming section performs the image forming operation after the refresh controlling section performs the refresh operation,
wherein the refresh determining section determines whether the refresh controlling section performs the refresh operation, either based on both the number of image formation times and the first elapsed time, or based on all of the number of image formation times, the first elapsed time, and the second elapsed time.

5. The electrophoretic display device according to claim 1, further comprising a temperature detecting section that detects a temperature at predetermined timing,
wherein the refresh determining section determines whether the refresh controlling section performs the refresh operation, either based on both the temperature and the first elapsed time, or based on all of the temperature, the first elapsed time, and the second elapsed time.

6. The electrophoretic display device according to claim 1, further comprising a detecting section that detects a predetermined operation performed by a user,
wherein the refresh determining section determines that the refresh controlling section performs the refresh operation if the detecting section detects the predetermined operation.

7. The electrophoretic display device according to claim 1, further comprising:
an image-formation-times counting section that counts a number of image formation times at which the image forming section performs the image forming operation after the refresh controlling section performs the refresh operation; and
a temperature detecting section that detects a temperature at predetermined timing,
wherein the refresh determining section determines whether the refresh controlling section performs the refresh operation based on both the number of image formation times and the temperature.

8. An electrophoretic display device comprising:
a first substrate having a first electrode;
a second substrate having a second electrode and arranged in confrontation with the first substrate, the first substrate and the second substrate forming a space therebetween, the first electrode and the second electrode being configured to generate an electric field having a direction, the direction being changeable depending on an electric voltage applied between the first electrode and the second electrode;
a display section provided in the space;
a dispersion medium filled in the display section and dispersed with a plurality of electrically-charged particles that migrates in accordance with the direction of the electric field;
an image forming section that, upon receiving an image forming request, applies the electric voltage between the first electrode and the second electrode to generate the electric field in the dispersion medium, thereby performing an image forming operation;
a refresh controlling section that, before the image forming section performs the image forming operation, switches the direction of the electric field alternately at predetermined timing to uniformly disperse the plurality of electrically-charged particles in the dispersion medium, thereby performing a refresh operation;
an image-formation-elapsed-time measuring section that measures a first elapsed time from a previous image forming operation performed by the image forming section until the image forming request; and
a refresh determining section that determines whether the refresh controlling section performs the refresh operation based on the first elapsed time,
wherein the refresh determining section determines that the refresh controlling section performs the refresh operation if a value calculated based on the first elapsed time exceeds a predetermined threshold, and wherein the refresh determining section determines that the refresh controlling section performs the refresh operation if a value calculated based on a value obtained by multiplying the first elapsed time by a predetermined weight exceeds a predetermined threshold.

9. The electrophoretic display device according to claim 8, further comprising a temperature detecting section that detects a temperature at predetermined timing, wherein the refresh determining section determines whether the refresh controlling section performs the refresh operation based on the temperature detected by the temperature detecting section at a time when the image forming request is made.

10. An electrophoretic display device comprising:

a first substrate having a first electrode;

a second substrate having a second electrode and arranged in confrontation with the first substrate, the first substrate and the second substrate forming a space therebetween, the first electrode and the second electrode being configured to generate an electric field having a direction, the direction being changeable depending on an electric voltage applied between the first electrode and the second electrode;

a display section provided in the space;

a dispersion medium filled in the display section and dispersed with a plurality of electrically-charged particles that migrates in accordance with the direction of the electric field;

an image forming section that, upon receiving an image forming request, applies the electric voltage between the first electrode and the second electrode to generate the electric field in the dispersion medium, thereby performing an image forming operation;

a refresh controlling section that, before the image forming section performs the image forming operation, switches the direction of the electric field alternately at predetermined timing to uniformly disperse the plurality of electrically-charged particles in the dispersion medium, thereby performing a refresh operation;

an image-formation-elapsed-time measuring section that measures a first elapsed time from a previous image forming operation performed by the image forming section until the image forming request;

a refresh determining section that determines whether the refresh controlling section performs the refresh operation based on the first elapsed time; and a refresh-elapsed-time measuring section that measures a second elapsed time from a previous refresh operation performed by the refresh controlling section until the image forming request, wherein the refresh determining section determines whether the refresh controlling section performs the refresh operation based on a display content of an image formed by the image forming request, and wherein the refresh determining section determines whether the refresh controlling section performs the refresh operation based on both the second elapsed time and the display content.

11. The electrophoretic display device according to claim 10, wherein the refresh determining section determines whether the refresh controlling section performs the refresh operation based on an attribute of a text contained in the image, the attribute of the text serving as the display content.

12. The electrophoretic display device according to claim 11, wherein the refresh determining section determines whether the refresh controlling section performs the refresh operation based on a size of the text, the size of the text serving as the attribute of the text.

13. The electrophoretic display device according to claim 12, wherein the refresh determining section determines that the refresh controlling section performs the refresh operation if a calculation value exceeds a predetermined threshold, the calculation value being obtained by multiplying a value indicative of the size of the text by a predetermined weight.

14. The electrophoretic display device according to claim 10, further comprising an image dividing section that divides the image into a plurality of small regions each having a predetermined area, each of the plurality of small regions including a plurality of pixels having respective colors, wherein the refresh determining section determines that the refresh controlling section performs the refresh operation if the colors of the plurality of pixels in at least one of the plurality of small regions satisfy a predetermined condition.

15. The electrophoretic display device according to claim 14, wherein the refresh determining section determines that the refresh controlling section performs the refresh operation if the colors of all of the plurality of pixels are the same in at least one of the plurality of small regions.

16. The electrophoretic display device according to claim 10, wherein the refresh determining section determines that the refresh controlling section performs the refresh operation if a value calculated based on the display content exceeds a predetermined threshold.

17. The electrophoretic display device according to claim 10, further comprising an image-formation-times counting section that counts a number of image formation times at which the image forming section performs the image forming operation after the refresh controlling section performs the refresh operation, wherein the refresh determining section determines whether the refresh controlling section performs the refresh operation based on both the number of image formation times and the display content.

18. The electrophoretic display device according to claim 10, wherein the refresh determining section determines whether the refresh controlling section performs the refresh operation based on both the first elapsed time and the display content.

* * * * *